US011203695B2

(12) United States Patent
Tuteja et al.

(10) Patent No.: US 11,203,695 B2
(45) Date of Patent: Dec. 21, 2021

(54) DURABLE SUPERHYDROPHOBIC SURFACES

(71) Applicants: The Regents of The University of Michigan, Ann Arbor, MI (US); The Government of the United States, as represented by the Secretary of the Air Force, Wright-Patterson Air Force Base, OH (US)

(72) Inventors: Anish Tuteja, Ann Arbor, MI (US); Kevin Golovin, Ann Arbor, MI (US); James W. Gose, Ann Arbor, MI (US); Mathew Boban, Ann Arbor, MI (US); Joseph M. Mabry, West Lancaster, CA (US); Marc Perlin, Ann Arbor, MI (US); Steven Ceccio, Dexter, MI (US)

(73) Assignees: THE REGENTS OF THE UNIVERSITY OF MICHIGAN, Ann Arbor, MI (US); The Government of the United States, as represented by the Secretary of the Air Force, Wright-Patterson Air Force Base, OH (US)

( * ) Notice: Subject to any disclaimer, the term of this patent is extended or adjusted under 35 U.S.C. 154(b) by 170 days.

(21) Appl. No.: 16/330,987

(22) PCT Filed: Sep. 6, 2017

(86) PCT No.: PCT/US2017/050270
§ 371 (c)(1),
(2) Date: Mar. 6, 2019

(87) PCT Pub. No.: WO2018/101999
PCT Pub. Date: Jun. 7, 2018

(65) Prior Publication Data
US 2019/0256722 A1     Aug. 22, 2019

Related U.S. Application Data

(60) Provisional application No. 62/383,775, filed on Sep. 6, 2016.

(51) Int. Cl.
*B32B 27/08*     (2006.01)
*C09D 5/16*     (2006.01)
(Continued)

(52) U.S. Cl.
CPC ............. *C09D 5/1681* (2013.01); *C09D 5/00* (2013.01); *C09D 5/16* (2013.01); *C09D 7/63* (2018.01);
(Continued)

(58) Field of Classification Search
CPC .... B05D 1/02; B05D 2518/10; B05D 3/0254; B05D 5/08; B05D 5/083; C08K 5/549;
(Continued)

(56) References Cited

U.S. PATENT DOCUMENTS 7,651,760 B2   1/2010   Gleason et al.
7,695,767 B2   4/2010   Strauss
(Continued)

FOREIGN PATENT DOCUMENTS

EP          2484726 A1    8/2012
EP          2590801 B1   12/2014
WO   WO2016044880    *   3/2016

OTHER PUBLICATIONS

Design of Durable De-Icing, Superhydrophobic, Superoleophobic Coatings (Year: 2015).*
(Continued)

*Primary Examiner* — Michael B Nelson
(74) *Attorney, Agent, or Firm* — Harness, Dickey & Pierce, P.L.C.

(57) ABSTRACT

Durable superhydrophobic components have a superhydrophobic material disposed (e.g., disposed) thereon that exhib-
(Continued)

Figure 1A:
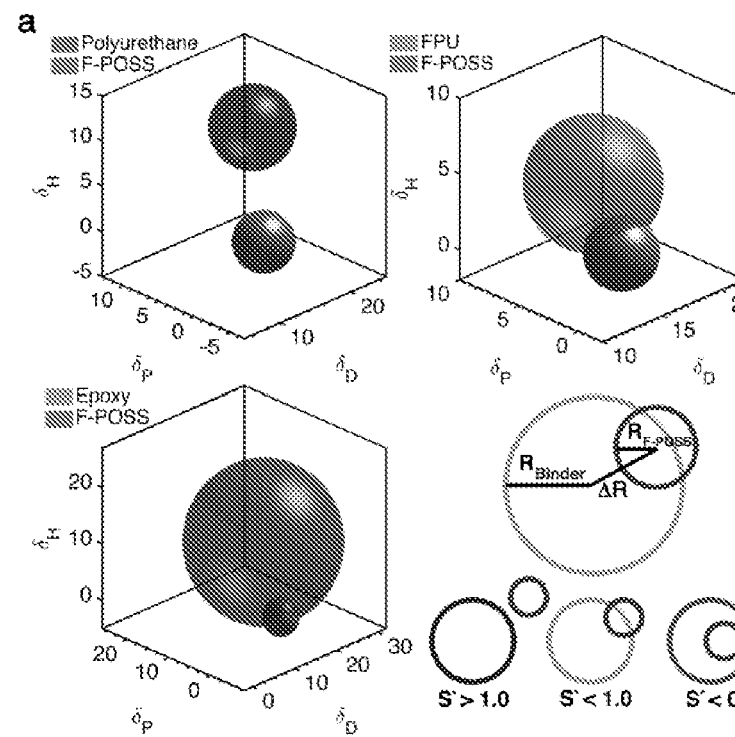

its an apparent advancing dynamic contact angle of ≥about 150° and a roll-off angle of about ≤15° for water after at least 100 abrasion cycles. The superhydrophobic material may comprise a low surface energy material and a polymeric material. The superhydrophobic material may be self-healing and capable of recovering its wettability after damage. In yet other aspects, a component comprises a surface that is superhydrophobic and reduces drag in turbulent flow conditions. The surface has an apparent advancing dynamic contact angle of ≥about 150° and a roll-off angle of ≤about 15° for water, and a product of dimensionless roughness ($k^+$) and a higher-pressure contact angle hysteresis of less than or equal to about 5.8. Methods of making such materials are also provided.

21 Claims, 15 Drawing Sheets

(51) Int. Cl.

| | | |
|---|---|---|
| C09D 7/65 | (2018.01) | |
| C09D 7/63 | (2018.01) | |
| C09D 201/00 | (2006.01) | |
| C09D 5/00 | (2006.01) | |
| C08K 3/36 | (2006.01) | |
| C08K 5/549 | (2006.01) | |
| C08K 9/02 | (2006.01) | |
| B32B 27/20 | (2006.01) | |
| B32B 27/28 | (2006.01) | |

(52) U.S. Cl.
CPC .............. *C09D 7/65* (2018.01); *C09D 201/00* (2013.01); *B32B 27/20* (2013.01); *B32B 27/283* (2013.01); *B32B 2255/26* (2013.01); *B32B 2264/1021* (2020.08); *B32B 2307/554* (2013.01); *B32B 2307/584* (2013.01); *B32B 2307/714* (2013.01); *B32B 2307/73* (2013.01); *B32B 2383/00* (2013.01); *C08K 3/36* (2013.01); *C08K 5/549* (2013.01); *C08K 9/02* (2013.01); *C09D 5/1675* (2013.01); *Y10T 428/31* (2015.01); *Y10T 428/31663* (2015.04)

(58) Field of Classification Search
CPC .. C08K 3/36; C08K 9/02; Y02P 70/10; C09D 201/00; C09D 5/00; C09D 5/16; C09D 5/1681; C09D 7/63; C09D 7/65; C09D 175/04; C09D 5/1675; B32B 2307/73; B32B 2383/00; B32B 2307/584; B32B 2307/714; B32B 27/283; B32B 2307/554; B32B 2255/26; B32B 27/20; B32B 2264/1021; Y10T 428/31663; Y10T 428/31
See application file for complete search history.

(56) References Cited

U.S. PATENT DOCUMENTS

| | | | |
|---|---|---|---|
| 7,943,234 B2 | 5/2011 | Lawin et al. | |
| 2008/0015298 A1* | 1/2008 | Xiong | C09D 127/18 524/432 |
| 2010/0004373 A1 | 1/2010 | Zhu et al. | |
| 2010/0203287 A1 | 8/2010 | Jiang et al. | |
| 2011/0097534 A1 | 4/2011 | Lee et al. | |
| 2013/0178568 A1* | 7/2013 | Meuler | C09D 5/1625 524/269 |
| 2014/0113144 A1 | 4/2014 | Loth et al. | |

OTHER PUBLICATIONS

Superoleophobic textured aluminum surfaces (Year: 2011).*
Campos, Raymond, et al. "Fluoroalkyl-Functionalized Silica Particles: Synthesis, Characterization, and Wetting Characteristics," *Langmuir* (2011) 27, pp. 10206-10215.
Celia, Elena et. al. "Recent advances in designing superhydrophobic surfaces," 2013, *Journal of Colloid and Interface Science*, vol. 402, pp. 1-18.
Daniello, Robert J. et al., "Drag Reduction in Turbulent Flows Over Superhydrophobic Surfaces," *Physics of Fluids* (2009) 21, 085103.
Golovin, Kevin et al., "Designing self-healing superhydrophobic surfaces with exceptional mechanical durability", *ACS Applied Materials & Interfaces*, 2017 (Online published date: Mar. 7, 2017), vol. 9, No. 12, pp. 11212-11223.
Henoch, C. et al., "Turbulent Drag Reduction Using Superhydrophobic Surfaces," in 3rd AIAA Flow Control Conference Fluid Dynamics and Co-located Conferences (American Institute of Aeronautics and Astronautics, 2006) Jun. 5-8, 2006, San Fransisco, California, 6 pages.
Jelly, Thomas et al., "Turbulence and Skin Friction Modification in Channel Flow With Streamwise-Aligned Superhydrophobic Surface Texture," *Physics of Fluids* 26, 095102, (2014).
Kim, John et al., "Turbulence statistics in fully developed channel flow at low Reynolds number," *Journal of Fluid Mechanics* (1987), 177, pp. 133-166.
Mabry, Jospeh M. et al., "Fluorinated polyhedral oligomeric silsesquioxanes (F-POSS)," *Angew. Chem.* Int. Ed. Engl. (2008), 47, pp. 4137-4140.
Min, Taegee et al., "Effects of Hydrophobic Surface on Skin-Friction Drag," *Physics of Fluids*, 16, L55-L58, (2004).
Schultz, M. P. et al., "The Rough-Wall Turbulent Boundary Layer From the Hydraulically Smooth to the Fully Rough Regime," *Journal of Fluid Mechanics* (2007), 580, pp. 381-405.
Srinivasan, Siddarth et al., "Solution spraying of poly(methyl methacrylate) blends to fabricate microtextured, superoleophobic surfaces," *Polymer*, 2011, vol. 52, No. 14, pp. 3209-3218.
Tribonet, "Wear resistant self healing hydrophobic coatings", 2017 (Online published date: May 1, 2017) (http://www.tribonet.org/a-self-healing-water-repellant-coating-thatsultra-durable/).
University of Michigan News, "A self-healing, water-repellent coating that's ultra durable", 2017 (Online published date: Apr. 4, 2017) (https://news.umich.edu/a-self-healing-water-repellent-coating-that-sultra-durable/).
Verho, Tuukka et. al., "Mechanically Durable Superhydrophobic Surfaces," 2010, *Advanced Material*, vol. 23, Issue 5, pp. 673-678.
Wang, Xia et al., "The surface properties and corrosion resistance of fluorinated polyurethane coatings", Journal of Fluorine Chemistry, 2015, vol. 176, pp. 14-19.
Woolford, B, et al., "Particle image velocimetry characterization of turbulent channel flow with rib patterned superhydrophobic walls," *Physics of Fluids*, 21, 085106 (2009) (Abstract Only).
Yang, Jin et al., "Superoleophobic Textured Aluminum Surfaces," *New Journal of Chemistry* (2011), 35, pp. 2422-2426.
International Search Report and Written Opinion issued in PCT/US2017/050270, dated Jul. 2, 2018; ISA/KR.

* cited by examiner

DURABLE SUPERHYDROPHOBIC SURFACES

CROSS-REFERENCE TO RELATED APPLICATIONS

This application is a U.S. National Phase Application under 35 U.S.C. 371 of International Application No. PCT/US2017/050270 filed on Sep. 9, 2017. This application claims the benefit and priority of U.S. Application Ser. No. 62/383,775 filed on Sep. 6, 2016. The entire disclosures of the above applications are incorporated herein by reference.

GOVERNMENT SUPPORT

This invention is made with government support under N00014-12-1-0874 awarded by the Office of Naval Research. The Government has certain rights in the invention.

RIGHTS OF THE GOVERNMENT

The invention described herein may be manufactured and used by or for the Government of the United States for all governmental purposes without the payment of any royalty.

FIELD

The present disclosure relates to designing superhydrophobic surfaces with unprecedented mechanical durability and their utility in drag reduction during turbulent flow.

BACKGROUND

This section provides background information related to the present disclosure which is not necessarily prior art.

Superhydrophobic surfaces (SHSs) have garnered much attention over the last few decades for their ability to be self-cleaning, drag-reducing, stain-resisting and anti-fouling. SHSs are of significant interest for a wide variety of applications, including military, commercial, architectural, marine, aerospace, automotive, healthcare, biomedical, optics, microfluidics, electronics, filtration, and other specialty applications, by way of non-limiting example. By trapping pockets of air in their porous texture, SHSs display water contact angles >150° and low roll-off angles. While many natural and artificial SHSs are available, they typically suffer from poor mechanical durability. Often, the fragile surface texture can be easily removed even by the swipe of a finger. SHSs that can survive the mechanically abrasive conditions experienced in a wide array of engineering applications remain elusive.

Moreover, even durable SHSs will eventually become damaged, eliminating their low surface energy and/or texture that provide the superhydrophobic properties. Akin to the lotus leaf's ability to regenerate its nano-structured wax, SHSs that can regenerate their surface texture and chemistry would be highly desirable. Thus, it would be desirable to form robust, mechanically durable superhydrophobic surfaces that exhibit physical and chemical self-healing. Such surfaces desirably can fully recover their water-repellency even after being abraded, scratched, burned, plasma cleaned, flattened, sonicated and chemically attacked. Furthermore, developing mechanically durable superhydrophobic surfaces that reduce drag in turbulent conditions would also be desirable.

SUMMARY

This section provides a general summary of the disclosure, and is not a comprehensive disclosure of its full scope or all of its features.

In certain aspects, the present disclosure provides a durable superhydrophobic component comprising a surface having a superhydrophobic material disposed thereon. The surface exhibits an apparent advancing dynamic contact angle of greater than or equal to about 150° for water and a roll-off angle of less than or equal to about 15° for water after at least 100 abrasion cycles.

In other aspects, the present disclosure provides a self-healing superhydrophobic component comprising a self-healing superhydrophobic material comprising a low surface energy material and a polymeric material. The self-healing superhydrophobic material exhibits an apparent advancing dynamic contact angle of greater than or equal to about 150° for water and a roll-off angle of less than or equal to about 15° for water.

In yet other aspects, the present disclosure provides a component comprising a surface that is superhydrophobic and reduces drag in turbulent flow conditions. The surface has an apparent advancing dynamic contact angle of greater than or equal to about 150° for water, a roll-off angle of less than or equal to about 15° for water, and a product of dimensionless roughness ($k^+$) and a higher-pressure contact angle hysteresis ($\Delta\theta^{HP}$) of less than or equal to about 5.8.

In further aspects, the present disclosure provides a method of making a durable superhydrophobic component. The method comprises spraying a substrate with a blend of a low surface energy material and a polymeric material precursor to form a superhydrophobic layer. A miscibility parameter ($S^*$) for the low surface energy material and the polymeric material is less than or equal to about 1. The superhydrophobic layer on the substrate has an apparent advancing dynamic contact angle of greater than or equal to about 150° for water and a roll-off angle of less than or equal to about 15° for water.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1B:
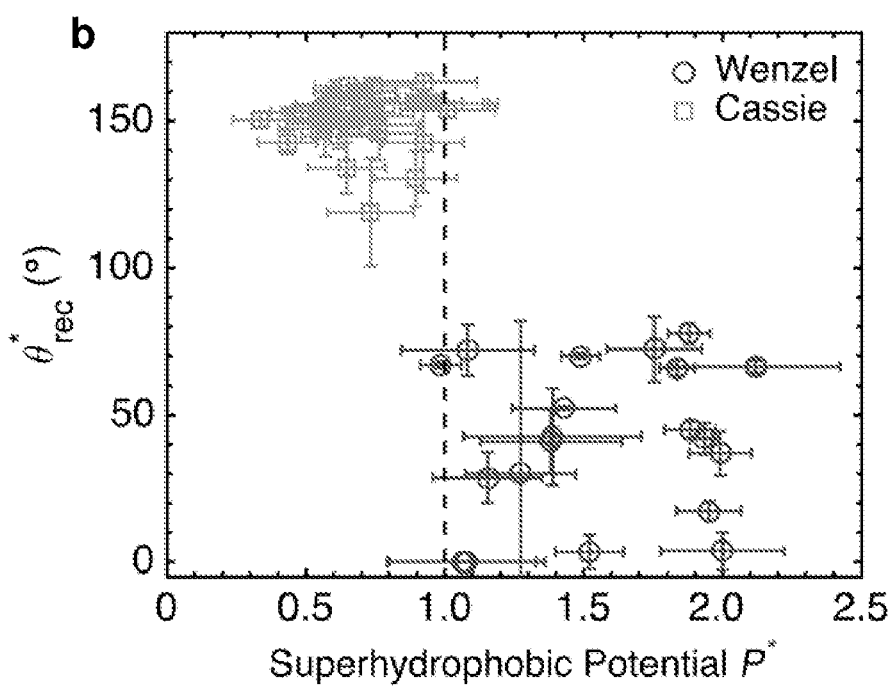
Figure 1C:
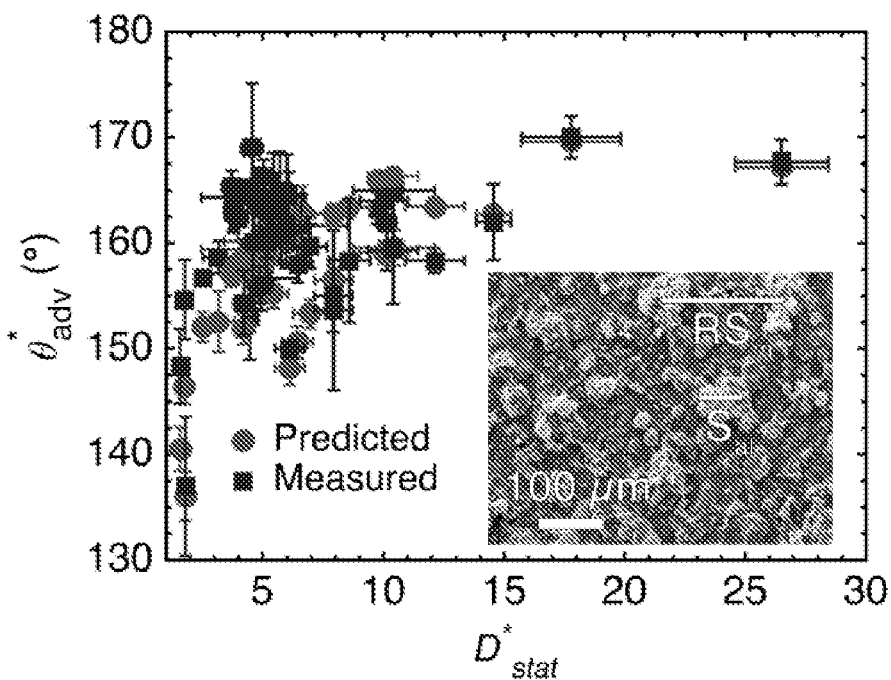
Figure 1D:
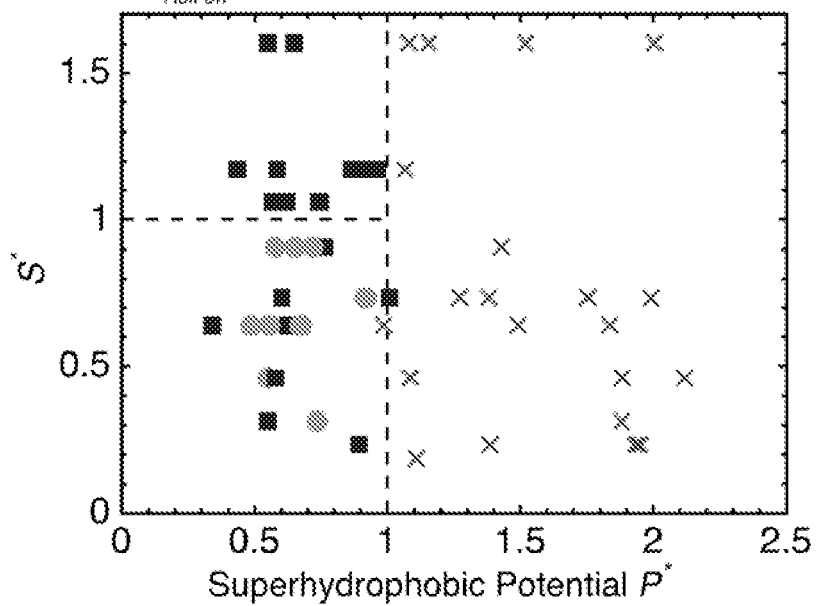

FIGS. 1A-1D show superhydrophobic surface parameters in accordance with certain aspects of the present disclosure. FIG. 1A shows a visualization of the S* parameter for three binders in 3D Hansen space. FIG. 1B shows apparent receding contact angle versus a P* parameter. A sharp transition at P*=1.0 denotes an equilibrium contact angle of 120°. FIG. 1C shows measured and predicted apparent advancing contact angles versus the developed statistical porosity parameter. FIG. 1D shows a phase diagram for surfaces sprayed with fluorinated polyhedral oligomeric silsesquioxanes (F-POSS). Only surfaces with P*<1.0 can be superhydrophobic ($\theta_{Roll-off}$<15°), and only for surfaces with 0≤S*≤1.0 have mechanical durability ($\theta_{Roll-off}$<150 after 100 abrasion cycles).

Figures 2A, 2B:
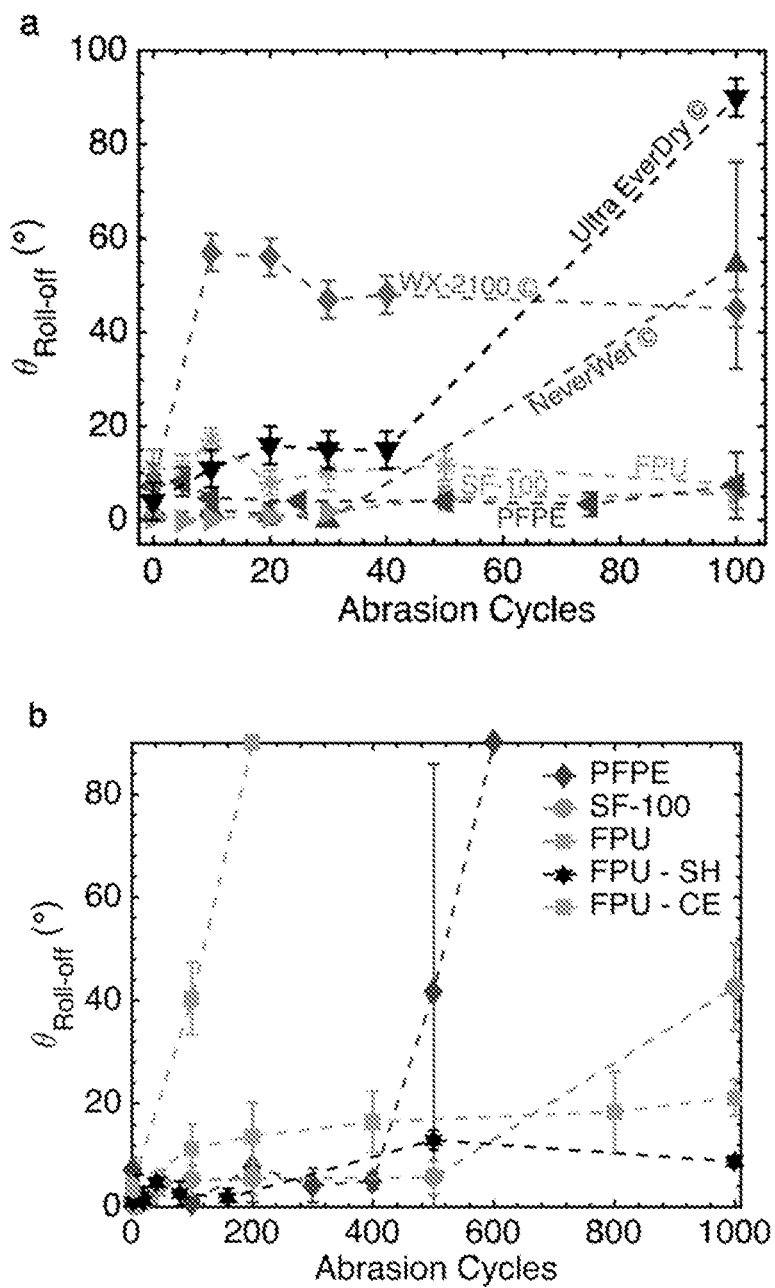
Figures 2C, 2D:
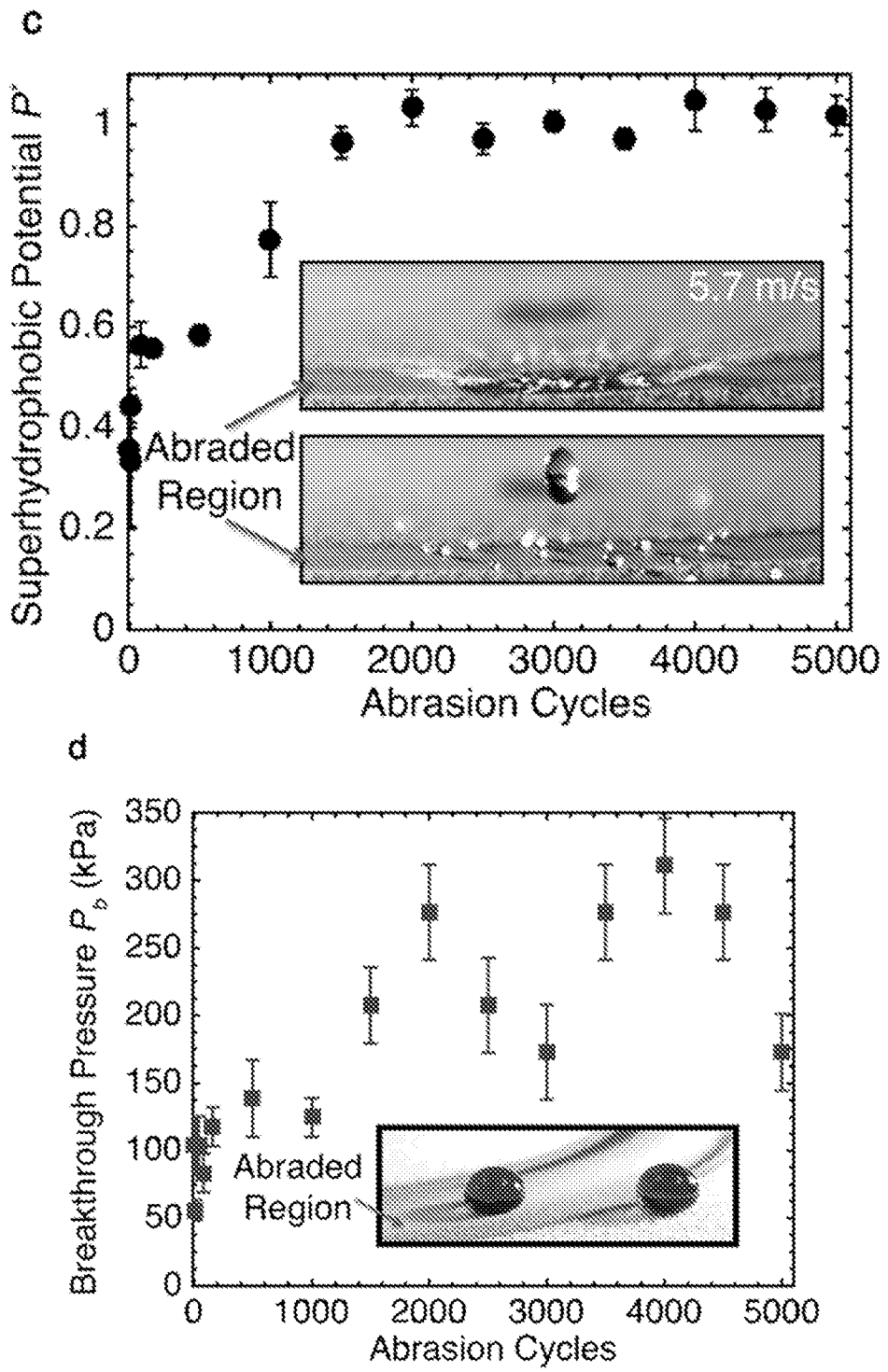

FIGS. 2A-2D shows comparative mechanical durability for superhydrophobic surfaces prepared in accordance with certain aspects of the present disclosure. FIG. 2A shows roll-off angles for three comparative commercially available SHSs and three SHSs fabricated in accordance with certain aspects of the present disclosure (with S*<1.0), all versus the number of abrasion cycles. FIG. 2B shows roll-off angles for three representative durable SHSs fabricated in accordance with certain aspects of the present disclosure. The data for the propylene glycol chain extended FPU and F-POSS (FPU-CE), and the self-healed FPU and F-POSS (FPU-SH) are also shown. FIG. 2C shows the P* parameter as a function of the number of abrasion cycles for the FPU and F-POSS coating. The inset shows a droplet impacting the abraded surface (3500 abrasion cycles) at 5.7 m/s and being completely rebounded from the abraded track. FIG. 2D shows a breakthrough pressure of the FPU and F-POSS coating as a function of abrasion. The inset shows dyed water existing in a stable Cassie state on the FPU and F-POSS coating, even after 5000 abrasion cycles, after it is self-healed.

Figures 3A, 3B:
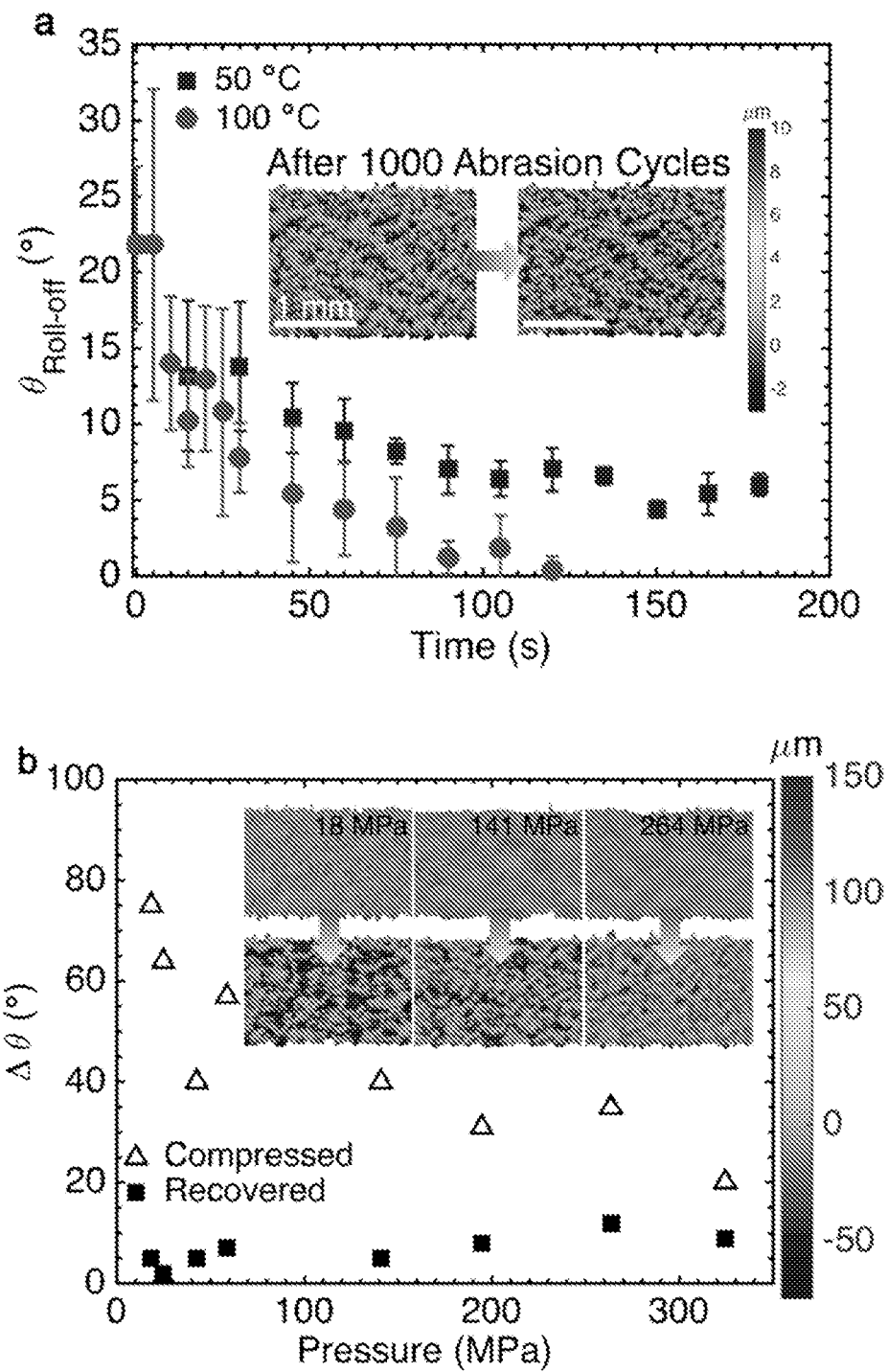
Figure 3C:
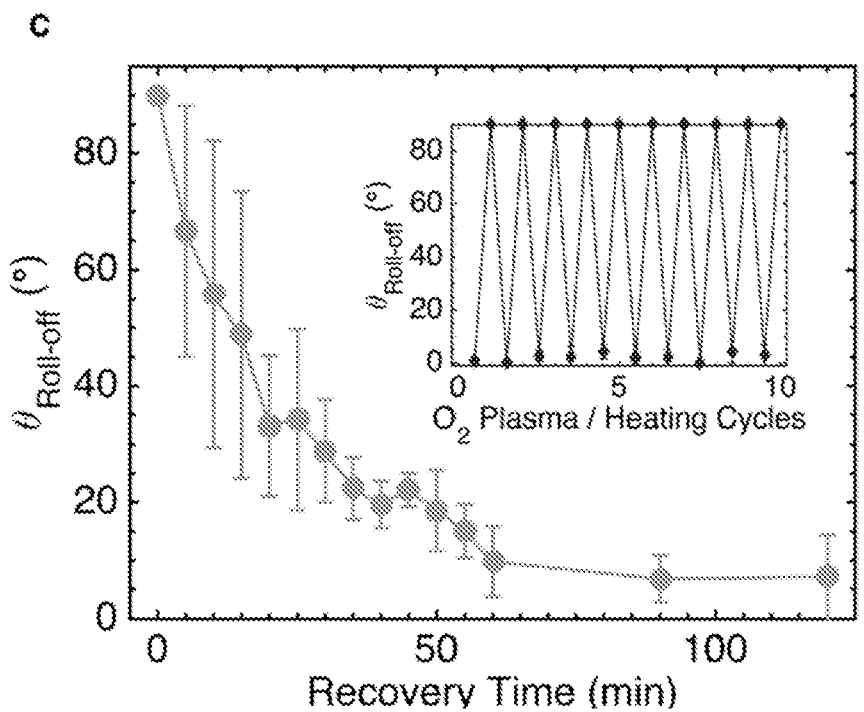
Figure 3D:
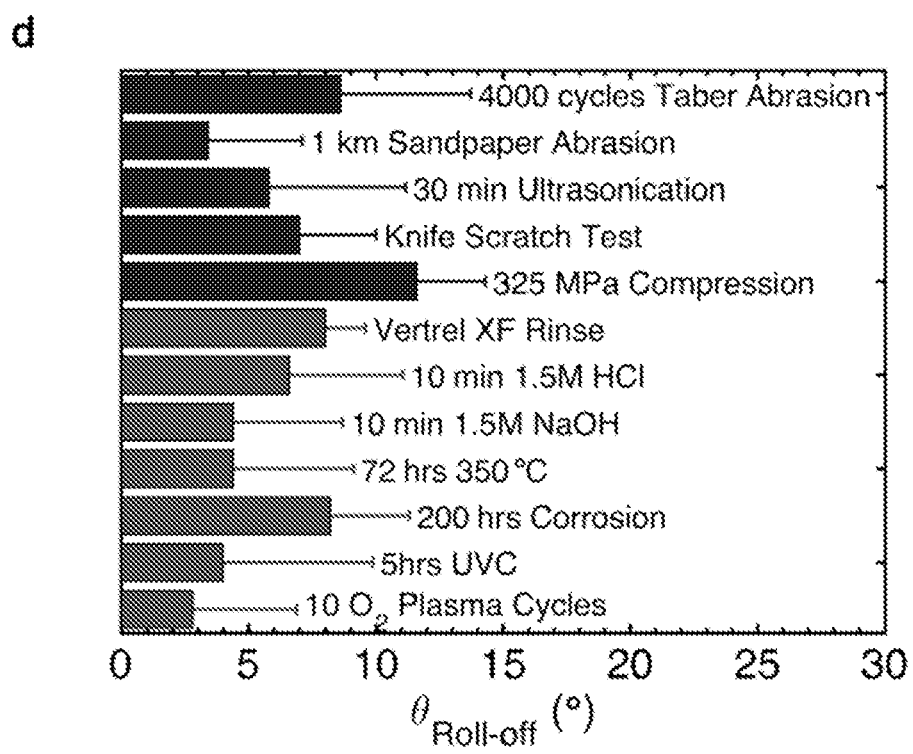

FIGS. 3A-3D show self-healing superhydrophobic surfaces prepared in accordance with certain aspects of the present disclosure. FIG. 3A shows self-healing properties of a FPU and F-POSS coating prepared in accordance with one variation of the present disclosure as a function of time and temperature, after 1,000 TABER™ abrasion cycles. The inset shows height-maps of the surface before and after self-healing. $S_q$ increased from 2.6 µm to 3.3 m during self-healing. FIG. 3B shows a contact angle hysteresis for the FPU and F-POSS coating in FIG. 3A before and after thermal recovery from compression, as a function of the compressive load. Note that the compressed coating's hysteresis decreases with an increase in applied load because the surface becomes smoother after compression. All compressed surfaces are fully wetted. FIG. 3C shows a roll-off angle of the FPU+15 wt. % F-POSS coating after $O_2$ plasma treatment, as a function of recovery time at 80° C. As fully fluorinated chains bloom to the surface, the surface energy decreases, and water is more easily repelled. The inset shows ten successive $O_2$ plasma/recovery cycles, highlighting that the self-healing nature is quite robust. FIG. 3D shows a host of additional durability characterizations performed on the FPU+15 wt. % F-POSS coating prepared in accordance with certain aspects of the present disclosure. Exposures that predominantly alter the roughness of the coating are shown as the first five rows, and ones that predominantly alter the surface chemistry are shown as the last seven rows.

Figures 4A, 4B:
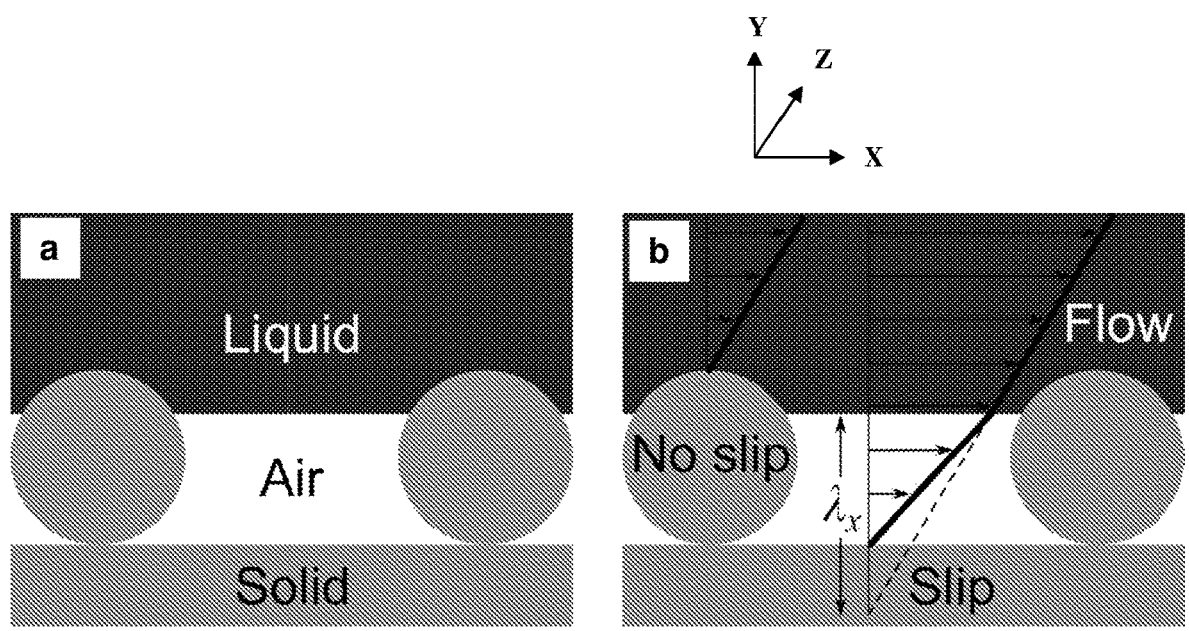

FIGS. 4A-4B. FIG. 4A shows a schematic of the three phase interface that can form on a superhydrophobic surface. FIG. 4B shows above the solid surface, a velocity of flow at the wall must go to zero to match the solid. However, over the air pocket, the velocity can be non-zero, creating a slip velocity and a corresponding slip length.

Figures 5A, 5B:
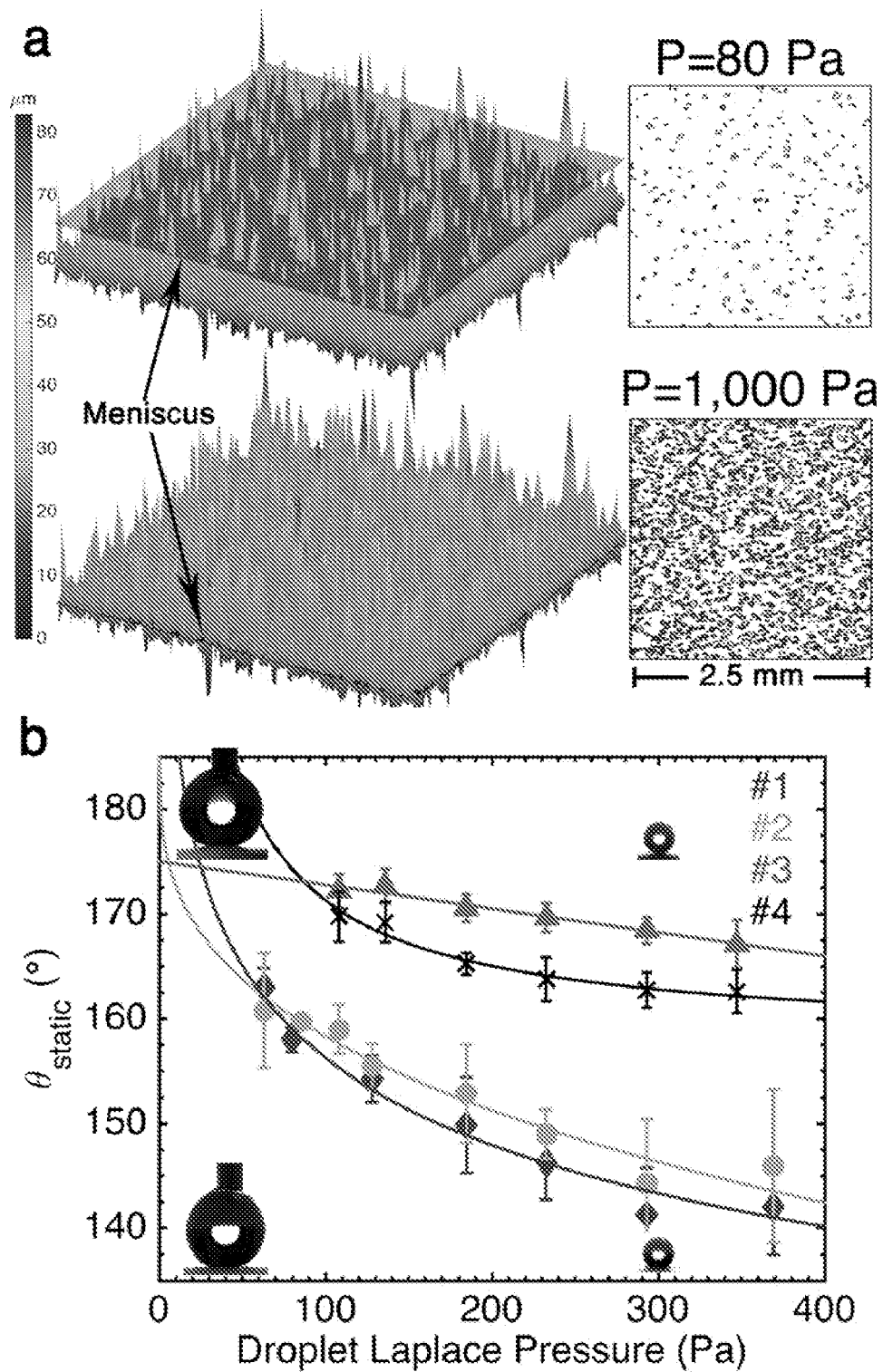
Figures 5C, 5D, 5E:
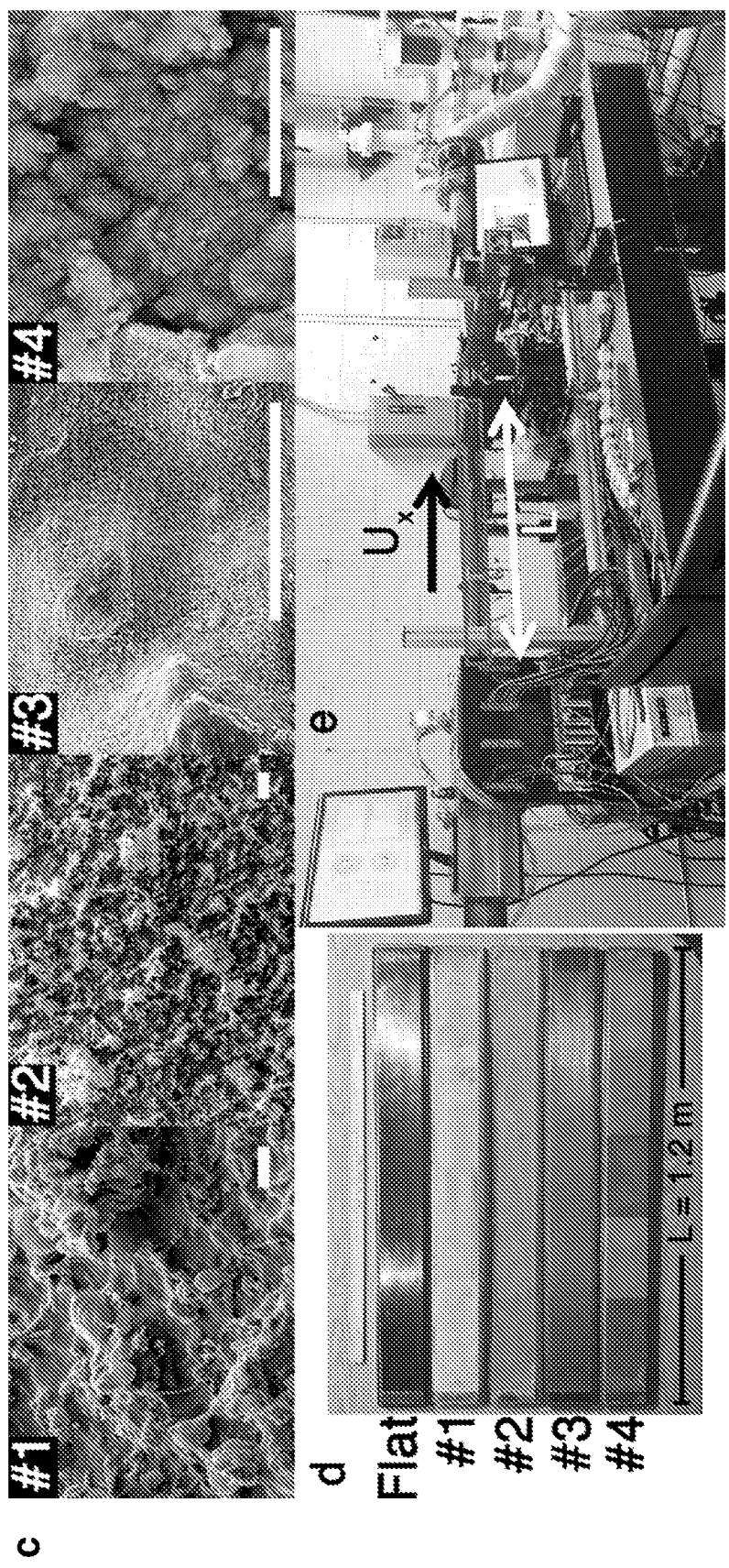

FIGS. 5A-5E. FIG. 5A shows a location of the meniscus for a superhydrophobic surface prepared in accordance with certain aspects of the present disclosure (designated surface no. 2) at low pressure (conventionally used to measure contact angles) and at higher pressure. The height maps are 2.5×2.5 mm. FIG. 5B shows θ* as a function of pressure for four exemplary surfaces prepared in accordance with certain aspects of the present disclosure. The lines are power law fits to the data. The insets show goniometer images of droplets on a first superhydrophobic surface (surface no. 1—in the lower insets) and a second superhydrophobic surface (no. 3—in the upper insets). FIG. 5C shows SEM micrographs of the four superhydrophobic surfaces. Scale bars are 20 am. FIG. 5D shows large-scale superhydrophobic surface samples fabricated in accordance with certain aspects of the present disclosure. Surface no. 4 comprises 5 tiled pieces. FIG. 5E shows a fully-developed turbulent channel flow facility. The 1.2 m long surfaces shown in FIG. 5D are inserted into the top of the test section (outlined).

Figures 6A, 6B:
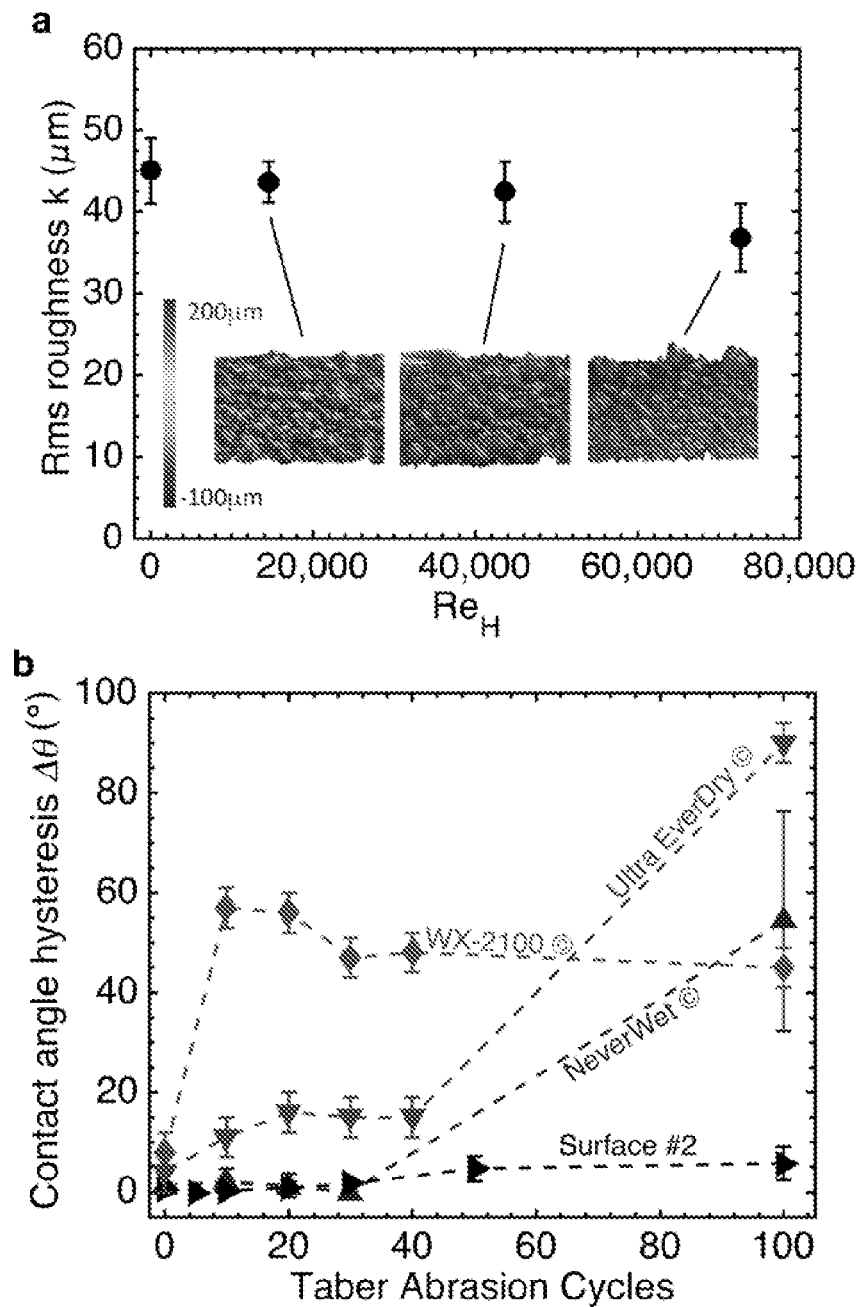

FIGS. 6A-6B evaluate mechanical durability of superhydrophobic surfaces prepared in accordance with certain aspects of the present disclosure that are subjected to high-speed flow in hourly increments, from 2 m/s up to 10 m/s. This corresponds to a height-based Reynolds number of about 20,000 up to about 80,000. After each speed, the root-mean-squared roughness k is measured to ensure that the surface remains intact. The inset height-maps above measure 1.3×1.3 mm. In FIG. 6B, the mechanical durability is also assessed by subjecting the most drag-reducing surface, the less rough variant of surface no. 2, to rotary Taber abrasion. Three commercially available and purportedly durable, superhydrophobic surfaces are tested for comparison. The contact angle hysteresis, measured conventionally (low pressure measurement) drastically increases as the comparative conventional commercial coatings became damaged.

Figures 7A, 7B:
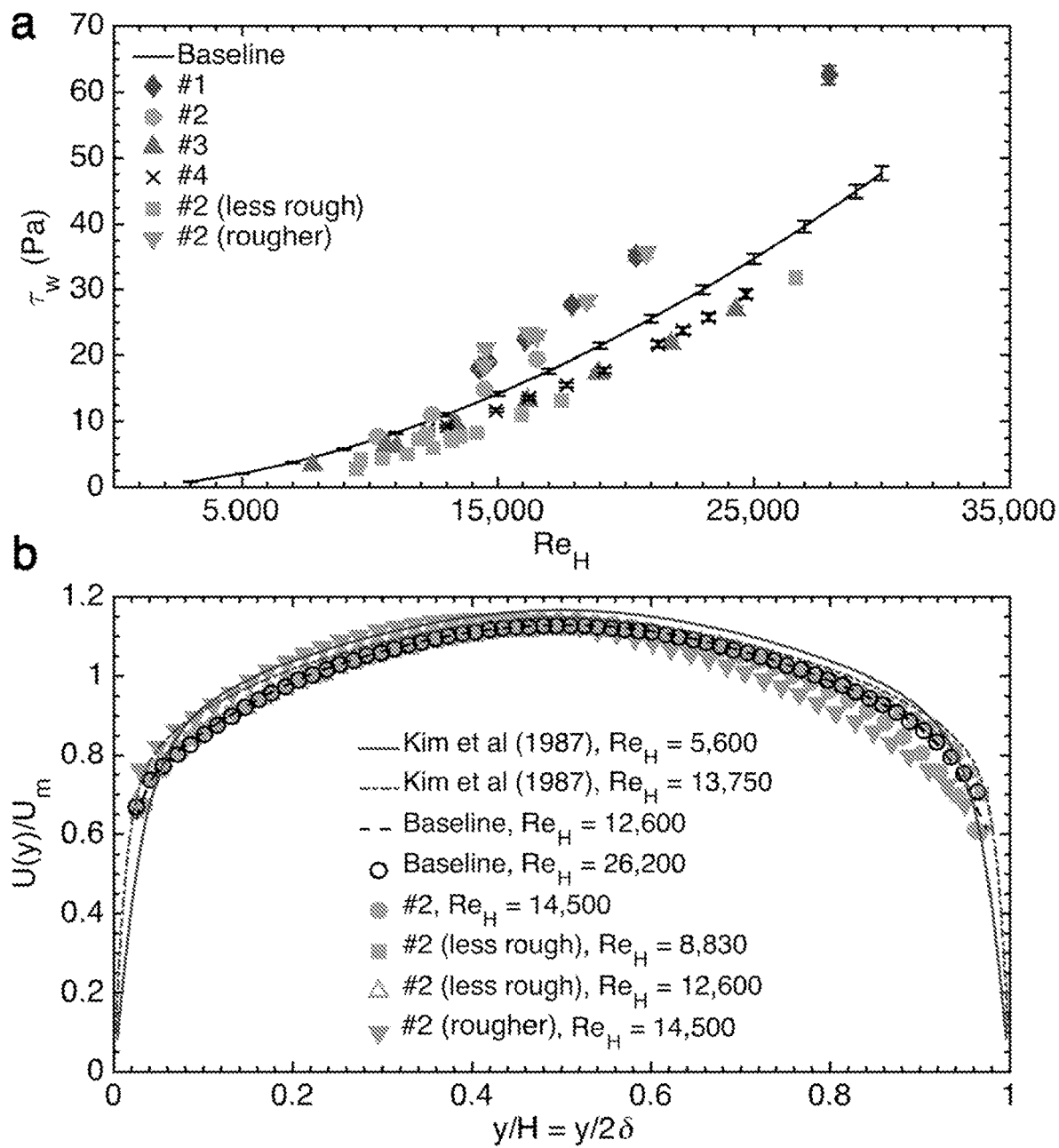

FIGS. 7A-7B shows turbulent flow properties. FIG. 7A shows average wall shear stress calculated from the streamwise pressure drop along a fully-developed turbulent channel with one baseline, hydraulically-smooth surface and one superhydrophobic surface. The reduction in shear stress is only seen on some of the superhydrophobic surfaces. FIG. 7B shows velocity profiles measured over the baseline and the variations of superhydrophobic surfaces no. 2 (have different roughness levels). Significant reduction in the velocity occurs in the presence of the roughness elements on the rougher surface variations. DNS data from Kim et al., "Turbulence statistics in fully developed channel flow at low Reynolds number," Journal of Fluid Mechanics, 177, 133-166, (1987), incorporated herein by reference, is included for reference purposes.

Figures 8A, 8B, 8C, 8D:
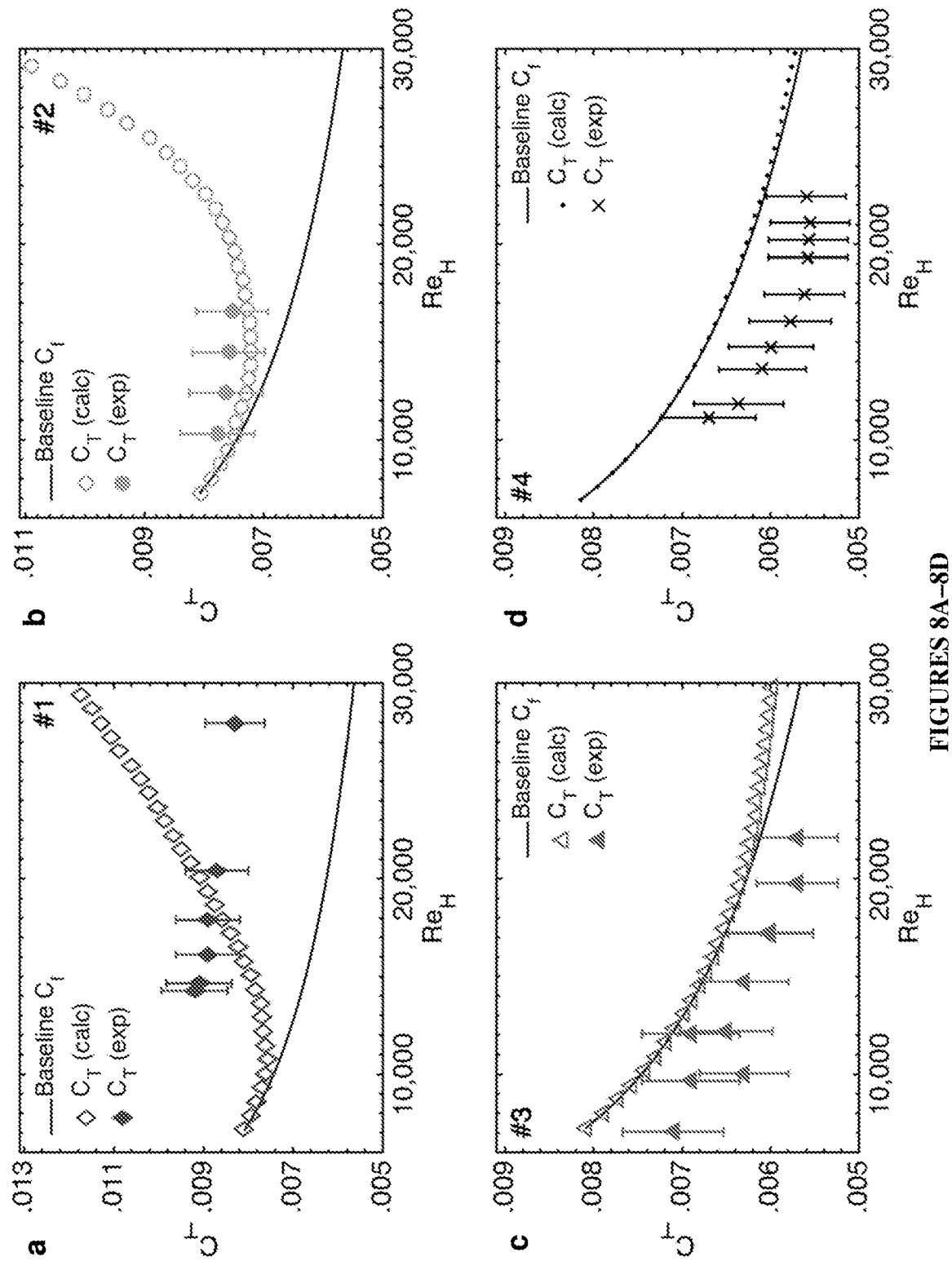

FIGS. 8A-8D show various skin-friction measurements. Experimental and calculated $C_T$ for four surfaces are provided. FIG. 8A shows a first superhydrophobic surface designated surface no. 1. FIG. 8B shows a second superhydrophobic surface designated surface no. 2. FIG. 8C shows a third superhydrophobic surface designated surface no. 3. FIG. 8D shows a fourth superhydrophobic surface designated surface no. 4. The calculated $C_T$ includes the skin-friction expected for a hydraulically smooth flat plate and the form drag due to asperity roughness. The experimental $C_T$ includes any asperity form drag as well as the skin-friction drag on the SHS. Therefore, surfaces nos. 1 and 2 may still be producing skin-friction drag reduction locally, but the effect is mitigated by the overall increase in form drag.

Figures 9A, 9B, 9C:
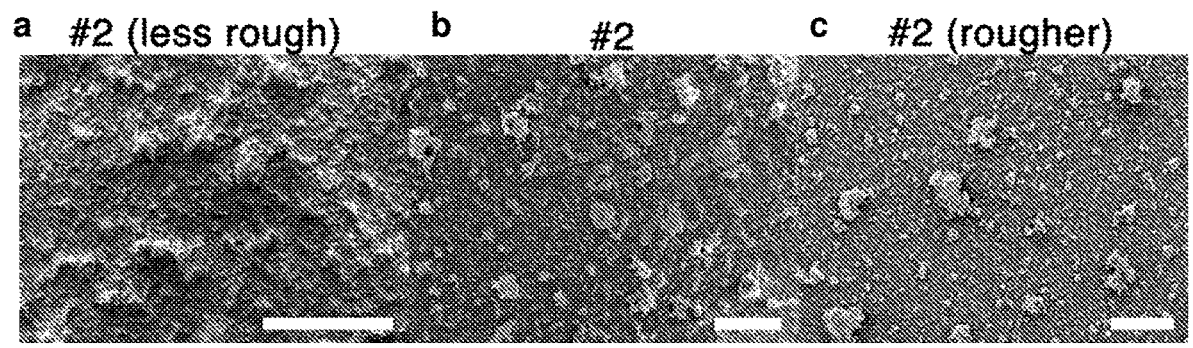

FIGS. 9A-9C show SEMs of surface roughness of superhydrophobic surfaces for three variations of the second superhydrophobic surface designated surface no. 2 in FIG. 8B.

Figure 10A:
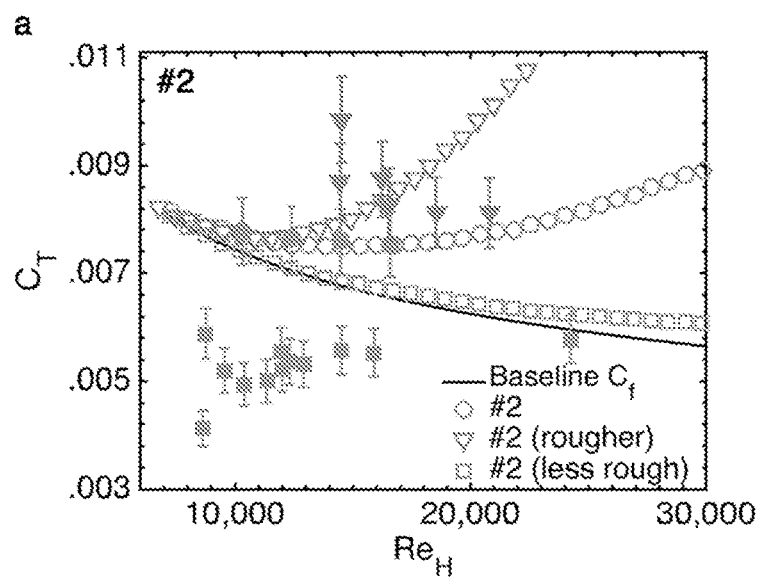
Figures 10B, 10C, 10D:
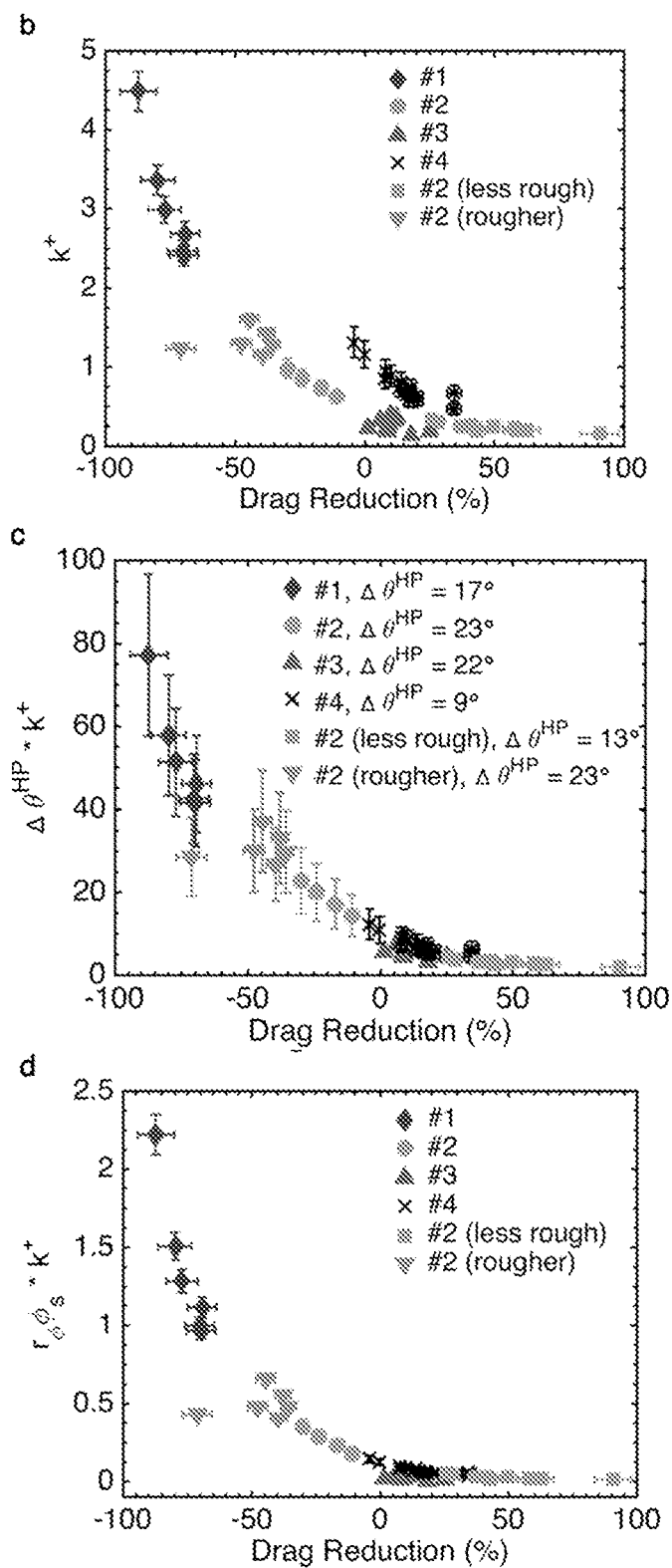

FIGS. 10A-10D. FIG. 10A shows show the effect of surface roughness of superhydrophobic surfaces for three variations of the second superhydrophobic surface designated surface no. 2 in FIGS. 8B and 9A-9C. These superhydrophobic surfaces exhibit either significant form drag, or significant drag reduction. Open symbols are the calculated $C_T$ values and closed symbols are the experimental data. The baseline is for the unmodified second hydrophobic surface no. 2 like in FIG. 8B. FIG. 10B shows drag reduction or drag increase (negative means drag increase) provided by all the surfaces considered as a function of the non-dimensional roughness. Drag associated with the smooth baseplate has been removed. FIG. 10C shows drag reduction data collapsed onto a single curve when plotted versus a product of a non-dimensional roughness and the higher-pressure contact angle hysteresis (370 Pa for a 250 nL droplet). FIG. 10D shows drag reduction data collapsed onto a single curve when plotted versus $r_\phi \phi_s$.

Figures 11A, 11B, 11C, 11D:
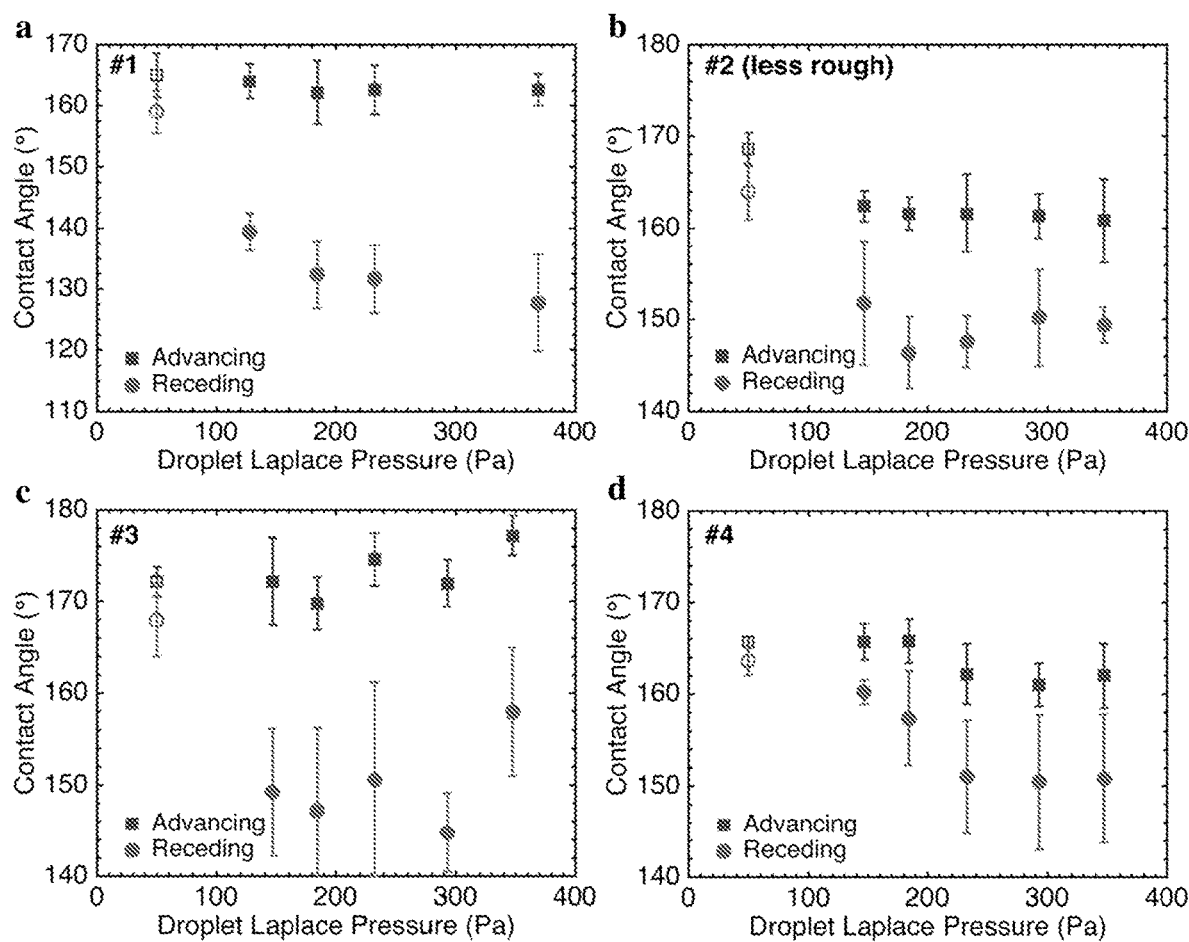

FIGS. 11A-11D show contact angle hysteresis at higher pressure. FIG. 11A shows a first superhydrophobic surface designated surface no. 1. FIG. 11B shows a second superhydrophobic surface designated surface no. 2. FIG. 11C shows a third superhydrophobic surface designated surface no. 3. FIG. 11D shows a fourth superhydrophobic surface designated surface no. 4. The advancing and receding contact angles for the four superhydrophobic surfaces are shown as a function of droplet Laplace pressure. The closed symbols are obtained using the maximum/minimum contact angle observed before a droplet slides. The open symbols are obtained using the conventional goniometric technique. An arbitrary pressure of 50 Pa is chosen for the conventional technique for ease of reading, and is not indicative of the size of the droplets used.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges. Ranges are also contemplated between disclosed values.

Unless otherwise indicated, percentages and ratios are by mass/weight.

The disclosures and relevant content of all references cited or discussed in this application are explicitly incorporated by reference herein, unless otherwise indicated.

Example embodiments will now be described more fully with reference to the accompanying drawings.

The present disclosure provides superhydrophobic surfaces (SHSs). SHSs have the ability to be self-cleaning, drag-reducing, stain-resisting, and anti-fouling. By trapping pockets of air in their porous texture, SHSs display water contact angles >150° and low roll-off angles. As noted above however, most conventional natural and artificial SHSs suffer from poor mechanical durability. A wide variety of methods have been utilized to evaluate the mechanical durability of conventional SHSs, including sand impact, rubbing with soft cloth, tape peel tests and sandpaper abrasion. Of the conventional SHSs that have shown the most promise for being mechanically durable, the conventional SHSs are formed from only a single material. Moreover, even the most durable conventional SHSs will eventually become damaged, eliminating their low surface energy and/or texture.

The present disclosure provides robust superhydrophobic surfaces that can survive the mechanically abrasive conditions experienced in a wide array of engineering applications. In certain aspects, such robust superhydrophobic surfaces may also be self-healing when damaged. As used herein, the term "self-healing" refers to self-recovery of at least a portion of initial properties, such as superhydrophobicity, or mechanical integrity of a material after destructive actions of an external or internal stress. Self-healing attributes are further discussed below. Furthermore, such SHS surfaces can be used for skin friction drag reduction in turbulent flow conditions.

By way of background, the primary measure of wetting of a liquid on a non-textured (or smooth) surface is the equilibrium contact angle θ, given by Young's relation as:

$$\cos\theta = \frac{\gamma_{SV} - \gamma_{SL}}{\gamma_{LV}}. \quad (1)$$

γ refers to the interfacial tension, and S, L, and V designate the solid, liquid, and vapor phases, respectively. The solid-vapor interfacial tension ($\gamma_{SV}$) and the liquid-vapor interfacial tension ($\gamma_{LV}$) are also commonly referred to as the solid surface energy and the liquid surface tension, respectively. Non-textured surfaces that display contact angles θ greater than or equal to about 90° with water (or other polar liquids) are considered to be hydrophobic. Typically, surfaces with high $\gamma_{SV}$ tend to be hydrophilic, whereas those with low $\gamma_{SV}$ (such as highly fluorinated compounds) tend to be hydrophobic.

Superhydrophobic surfaces are those that display a contact angle of greater than or equal to about 150° along with low contact angle hysteresis (difference between the advancing $\theta_{adv}$ and the receding contact angle $\theta_{rec}$) with water. Water droplets can easily roll-off from and bounce on such surfaces. In certain variations, the present disclosure provides a component having a durable superhydrophobic surface. The "superhydrophobic" surface exhibits an apparent advancing dynamic contact angle of greater than or equal to about 150° for water. Superhydrophobic surfaces are those that display a contact angle of greater than or equal to about 150°, optionally greater than or equal to about 151°, optionally greater than or equal to about 152°, optionally greater than or equal to about 153°, optionally greater than or equal to about 154°, optionally greater than or equal to about 155°, optionally greater than or equal to about 156°, optionally greater than or equal to 157°, optionally greater than or equal to about 158°, optionally greater than or equal to about 159°, and in certain aspects, optionally greater than or equal to about 160° along with low contact angle hysteresis (difference between the advancing $\theta_{adv}$ and the receding contact angle $\theta_{rec}$) for water.

The superhydrophobic surface according to certain variations of the present disclosure also exhibits a roll-off angle of less than or equal to about 15° when measured with a L drop of water. Roll-off angle is an angle of inclination of a surface at which a drop of liquid rolls off of it. In certain other variations, the roll-off angle of the superhydrophobic surfaces provided in accordance the present disclosure may be less than or equal to about 14°, optionally less than or equal to about 13°, optionally less than or equal to about 12°, optionally less than or equal to about 11°, optionally less than or equal to about 10°, optionally less than or equal to about 9°, optionally less than or equal to about 8°, optionally less than or equal to about 70, optionally less than or equal to about 6°, and in certain variations, optionally less than or equal to about 5°.

The superhydrophobic surfaces may be a superhydrophobic material or coating disposed (e.g., deposited) on a substrate of a component. The substrate may be formed of a variety of materials like metals, glass, siloxanes, polymers, and the like. In certain aspects, the durable or robust superhydrophobic properties of the superhydrophobic materials disposed on the substrate result in maintaining both a contact angle of greater than or equal to about 150° and also a roll-off angle of less than or equal to about 15° for water after at least about 100 abrasion cycles. An abrasion cycle may be mechanical abrasion performed in accordance with ASTM standard D4060, for example, by using a rotary TABER® Abrasion machine with a CS-10 resilient abrader and a total weight of 60 g. The abrader is refaced before each set of abrasion cycles using sand paper (from Taber®). Refacing is done at 25 cycles/min for 25 cycles. For abrasion, a sample having the superhydrophobic surface may be clamped down and abraded for up to 5000 cycles at 60 cycles/min. After a total number of mechanical abrasion cycles are completed, the sample is assessed for its properties, for example, an apparent advancing dynamic contact angle and roll-off angle for water.

In certain variations, the superhydrophobic surface exhibits both a contact angle of greater than or equal to about 150° and a roll-off angle of less than or equal to about 15° for water after greater than or equal to about 150 abrasion cycles. In other variations, the superhydrophobic surface exhibits both such a contact angle (of greater than or equal to about 150°) and a roll-off angle (of less than or equal to about 15° for water) after greater than or equal to about 200 abrasion cycles, optionally after greater than or equal to about 300 abrasion cycles, optionally after greater than or equal to about 400 abrasion cycles, optionally after greater than or equal to about 500 abrasion cycles, optionally after greater than or equal to about 600 abrasion cycles, optionally after greater than or equal to about 700 abrasion cycles, optionally after greater than or equal to about 800 abrasion cycles, optionally after greater than or equal to about 900 abrasion cycles, optionally after greater than or equal to about 1,000 abrasion cycles, optionally after greater than or equal to about 1,100 abrasion cycles, optionally after greater than or equal to about 1,200 abrasion cycles, optionally after greater than or equal to about 1,300 abrasion cycles, optionally after greater than or equal to about 1,400 abrasion cycles, optionally after greater than or equal to about 1,500 abrasion cycles, optionally after greater than or equal to about 1,600 abrasion cycles, optionally after greater than or equal to about 1,700 abrasion cycles, optionally after greater than or equal to about 1,800 abrasion cycles, optionally after greater than or equal to about 1,900 abrasion cycles, optionally after greater than or equal to about 2,000 abrasion cycles, optionally after greater than or equal to about 2,500 abrasion cycles, optionally after greater than or equal to about 3,000 abrasion cycles, optionally after greater than or equal to about 3,500 abrasion cycles, optionally after greater than or equal to about 4,000 abrasion cycles, optionally after greater than or equal to about 4,500 abrasion cycles, and in certain aspects, optionally after greater than or equal to about 5,000 abrasion cycles.

In certain variations, the superhydrophobic surface exhibits a contact angle hysteresis of less than or equal to about 15° for water, optionally less than or equal to about 10° for water, optionally less than or equal to about 5° for water, and in certain variations, the contact angle hysteresis may be less than or equal to about 3° for water.

In other aspects, the superhydrophobic material has a contact angle hysteresis of less than or equal to about 15°, optionally less than or equal to about 10°, optionally less than or equal to about 5°, optionally less than or equal to about 3° for water after greater than or equal to about 100 abrasion cycles, optionally greater than or equal to about 150 abrasion cycles, optionally after greater than or equal to about 200 abrasion cycles, optionally after greater than or equal to about 300 abrasion cycles, optionally after greater than or equal to about 400 abrasion cycles, optionally after greater than or equal to about 500 abrasion cycles, optionally after greater than or equal to about 600 abrasion cycles, optionally after greater than or equal to about 700 abrasion cycles, optionally after greater than or equal to about 800 abrasion cycles, optionally after greater than or equal to about 900 abrasion cycles, and in certain aspects optionally after greater than or equal to about 1,000 abrasion cycles.

In certain aspects, the robust superhydrophobic surfaces of the present disclosure comprise materials selected based upon chemistry and miscibility described herein. The lowest possible surface energy ($\gamma_{sv} \approx 6$ mN/m) is achieved with a monolayer of —$CF_3$ (trifluoromethyl) groups. Chemically grafting such monolayers requires a specific chemistry for the substrate on which they are being reacted. Moreover, the thin monolayer only renders the uppermost surface hydrophobic; any surface degradation will expose the higher surface energy substrate material beneath the thin layer. Incorporating highly perfluorinated compounds within a coating or material can achieve equally low surface energies, without the need for chemical grafting. Such coatings can be universally applied to any substrate or component, and impart low surface energy throughout the entire thickness of the coating.

In certain aspects, the present disclosure provides superhydrophobic surfaces comprising blends of distinct materials, for example, comprising a low surface energy material and a polymeric material. As will be described further herein, the superhydrophobic surface comprises a material where a miscibility parameter (S') for a low surface energy material and a polymeric material is less than or equal to about 1.

In certain variations, the low surface energy material comprises octakis(1H, 1H,2H,2H-heptadecafluorodecyl) polyhedral oligomeric silsesquioxane (F-POSS). In certain other embodiments, the low surface energy material may comprise octakis(1H,1H,2H,2H-tridecafluorooctyl) polyhedral oligomeric silsesquioxane, octaisobutyl polyhedral oligomeric silsesquioxane (OibPOSS), octakis(1H,1H,2H,2H-nonafluorohexyl) polyhedral oligomeric silsesquioxane, and/or solid alkanes having 18 or more carbon atoms, such as eicosane ($C_{20}H_{42}$). In other variations, the low surface energy material may be a low surface energy particle. Examples of suitable low surface energy particles include fluoro-functionalized silica particles, alkyl-functionalized silica particles, polydimethylsiloxane-functionalized silica particles, particles made of hydrophobic materials, such as fluoropolymers like polytetrafluoroethylene (PTFE), perfluoropolyether (PFPE), polydimethylsiloxanes (PDMS), polystyrene, polyethylene, and any combinations thereof.

The polymeric material may be an elastomer, for example, an elastomeric binder. In certain variations, the elastomer may have an elastic modulus or Young's Modulus range of greater than or equal to about 100 kPa to less than or equal to about 10 MPa. In certain variations, the polymeric material may have an elastic moduli up to a few GPa (e.g., 2-3 GPa), although such a material is not traditionally considered to be an elastomer. The polymeric material may be selected from the group consisting of: polydimethylsiloxane (PDMS), polyurethane (PU), fluorinated polyurethane (FPU), perfluoropolyether (PFPE), cyanoacrylate, ethyl-cyanoacrylate, chlorinated rubber, natural rubber, epoxy, polystyrene, polyvinyl chloride, polyalkylenes, such as polyethylene, polypropylene, polyisobutylene, or polyisoprene, acrylates and methacrylates, such as polymethyl methacrylate, polyvinylidine fluoride, polyethylene terephthalate, polyvinyl ether, polyvinyl acetate, cellulose acetate, ethyl cellulose, and combinations thereof. In certain variations, the polymeric material may be selected from the group consisting of: polydimethylsiloxane (PDMS), polyurethane (PU), fluorinated polyurethane (FPU), perfluoropolyether (PFPE), cyanoacrylate, ethyl-cyanoacrylate and combinations thereof.

In certain aspects, the present disclosure provides blends of polymeric material binders and octakis(1H,1H,2H,2H-heptadecafluorodecyl) polyhedral oligomeric silsesquioxane (F-POSS, 7, $\gamma_{sv} \approx 10$ mN/m) that are sprayed onto a substrate or component to provide robust superhydrophobic surfaces. Spray coating is inexpensive, scalable and allows control over the surface energy and texture of the inventive coatings via simple changes in experimental parameters. However, because F-POSS is highly fluorinated, it tends to be immiscible with most polymers, binders and solvents. The miscibility of a low surface energy material, like F-POSS, within a polymeric material plays an important in determining the morphology and surface energy of the final sprayed surface. As detailed herein, both the durability and water repellency of a SHS can be finely tuned based on the miscibility of select materials in such a system.

The cohesive energy of any material species can be broken into its dispersive, polar, and hydrogen bonding Hansen solubility parameters, $(\delta_D, \delta_P, \delta_H)$. A miscibility sphere can be constructed for any compound, with its center at some point in three-dimensional (3D) solubility space, and its volume encompassing all good solvents. Miscibility spheres for a representative low surface energy material, F-POSS, and a variety of polymeric material binders are provided in FIG. 1A by screening their solubility in a large number of solvents. In order to quantify a polymer's miscibility with F-POSS, a miscibility parameter S* is developed, which is given as:

$$S^* = \frac{\Delta R - R_{Binder} + R_{F-POSS}}{2R_{F-POSS}} \quad (2)$$

Here $\Delta R$ is the distance in 3D solubility space between the centers of the F-POSS sphere and the polymeric material binder sphere, with their radii denoted by $R_{F-POSS}$ and $R_{Binder}$, respectively. Similar to Hansen's Relative Energy Difference (RED) value, S* is defined such that F—POSS is completely immiscible with a polymeric binder when S*>1.0; the two spheres do not overlap (see schematic in FIG. 1A). Alternately, binders with S*<0 have solubility spheres that completely encompass the F-POSS sphere, and are hence fully miscible (at a given concentration). In between these two extremes is the regime of partial miscibility, which has been discovered to have far-reaching consequences for the final surface's superhydrophobic durability as discussed below.

The S* parameter provides the ability to predict if F-POSS will phase separate from the polymeric material binder during spray coating. This manifests in the final surface's root-mean-squared roughness, $S_q$. For example, the solubility spheres for a polyurethane and an epoxy, which are both commonly used hydrophilic polymeric adhesives, are determined in combination with F-POSS. For the epoxy, S*≈0.2, and an epoxy+5 wt. % F-POSS blend, when sprayed, results in a smooth surface with $S_q$=0.8 μm. Conversely, for the polyurethane, S*≈1.6, and a polyurethane+5 wt. % F-POSS blend, when sprayed in the exact same manner, results in a very rough surface, with $S_q$=41 μm. Thus, chemistry alone can induce roughness during the spray coating process. However, a large $S_q$ alone does not necessarily result in superhydrophobicity.

Surface texture is also important in superhydrophobicity. Water on SHSs can exist in the Cassie state, in which air pockets are trapped in the surface's porous texture. However, water can displace these air pockets, leaving the surface in a wetted state. SHSs are ideally designed such that the Cassie state is energetically preferred. Here, a new method is provided to predict when the Cassie state would be energetically favorable using only statistical geometric properties of a given surface. Because low surface energy material (e.g., filler like F-POSS or particle)/polymeric material combination exhibits a distinct, characteristic morphology, universal metrics that characterize surfaces with widely varying topographies is desirable. To do so, three statistical surface properties are measured: peak periodicity ($RS_m$), auto-correlation length ($S_{al}$) and Wenzel roughness (r—the ratio of the actual surface area to its projected area). $RS_m$ represents a length along the surface between large surface features, and can be thought of as the center-to-center distance between texture elements. $S_{al}$ denotes the length at which a surface no longer exhibits self-similarity, and can be thought of as an average size of the largest texture features. Statistical porosity of the surface can be defined as (inset, FIG. 1C):

$$D^*_{stat} = (RS_m/S_{al})^2 \quad (3)$$

where the second power is added to convert from properties measured along one dimensional height profiles to the porosity of a two-dimensional surface. Larger values of $D^*_{stat}$ indicate surfaces with higher porosity.

For the Cassie state to be favored over the wetted, Wenzel state, it desirably is at the global energy minimum. If the free energies of the two states are balanced, a critical equilibrium contact angle $\theta_c$ is found, which the equilibrium contact angle $\theta$ of a surface of given geometry must exceed in order to remain non-wetted. $\theta_c$ is given by:

$$\cos \theta_c (\phi_s - 1)/(r - \phi_s) \quad (4)$$

where $\phi_s$ is the fraction of solid in contact with water (note $D^*_{stat} \approx 1/\phi_s$). Stated differently, and in view of the fact that equilibrium water contact angles cannot exceed 120°, there exists some minimal texture that any surface, regardless of chemistry, must exhibit in order to achieve an energetically favorable Cassie state. Substituting this maximum contact angle into equation (4) yields, $$\cos \theta_c = \cos 120° = (1/D^*_{stat} - 1)/(r - 1/D^*_{stat})$$

$$-0.5 = (1 - D^*_{stat})/(rD^*_{stat} - 1)$$

A surface's superhydrophobic potential, P*, is then defined such that P*<1.0 only when the Cassie state is the global energy minimum. Doing so yields:

$$P^* = 2(D^*_{stat} - 1)/(rD^*_{stat} - 1) \quad (5).$$

For any surface that exhibits P*>1.0, the wetted state is energetically preferred, regardless of surface chemistry. Water can exist in a metastable Cassie state through the addition of re-entrant texture, hence a value of P*>1.0 does not necessarily predict wetting.

P* is useful because SHSs are often created by modifying a given geometry with a low surface energy layer. As such, measuring P* allows one to determine a priori if a geometry on a surface will be superhydrophobic before applying such a monolayer, which is often quite expensive. Moreover, if a surface is superhydrophobic despite a value of P*>1.0, water will exist in a metastable Cassie state, and such a SHS should be used with caution. By measuring the dynamic contact angles on many surfaces, both wetted and non-wetted, the effectiveness of P* is demonstrated.

As noted above, when water initially advances on an SHS, it displays a maximum apparent contact angle, $\theta^*_{adv}$. If any texture elements become wetted, the apparent angle at which water recedes, $\theta^*_{rec}$, will decrease. Thus, $\theta^*_{adv}$ is a measure of the SHS's inherent porosity (e.g., fraction of air pockets), ignoring how stable the air pockets are, and $\theta^*_{rec}$ gives an indication of their stability.

$\theta^*_{rec}$ is measured for more than fifty combinations of F-POSS and various polymeric materials/binders, as a function of P* as shown in FIG. 1B. These polymeric material/binders include both crosslinked networks, such as different urethanes, acrylates, epoxies, and cyanoacrylates, as well as linear polymers such as polystyrene, polymethylmethacrylate and polyisobutylene. A high $\theta^*_{rec}$ is observed only for systems with a stable Cassie state. This is confirmed by the sharp jump in $\theta^*_{rec}$ at a value of P*=1.0. This value for P*, corresponding to an equilibrium contact angle $\theta \approx 120°$, indicates that all the surfaces had a high percentage of F-POSS at the solid-liquid interface, although there are wide variations in topography. Thus, it is possible to predict if an F-POSS-containing surface could be superhydrophobic solely by measuring P*. Without measuring P*, there is no easy way to determine if a randomly textured surface will be superhydrophobic, a priori. Moreover, for surfaces with P*<1.0, recasting the Cassie-Baxter relation in terms of $D^*_{stat}$ effectively predicted $\theta^*_{adv}$ as shown in FIG. 1C. The predictive power of $D^*_{stat}$ and P* extends to other SHSs not containing F-POSS. As described further below, these include three commercially available superhydrophobic coatings, lithographically fabricated microstructures, textured metals treated with perfluorinated monolayers and polymeric binder materials filled with hydrophobic particles. As such, the design parameters can be used to produce SHSs with a wide range of polymeric binders, fillers and fabrication techniques.

For each polymeric material (fixed S*), P* is varied by adjusting a ratio of polymeric material/binder to F-POSS in the blend. Combining the S* and P* parameters provides the ability to construct a phase diagram of possible surfaces created when spraying F-POSS with any polymeric material, as shown in FIG. 1D. Here surfaces are designated as "x's" where the water roll-off angle is greater than 15° ($\theta_{Roll-off}$>15°) and not superhydrophobic. Surfaces where $\theta_{Roll-off}$<15° and are superhydrophobic (SHS) are shown as squares. These two regions are demarcated by a line at P*=1.0, i.e. no SHS is observed having P*>1.0.

F-POSS is known to migrate to the solid-air interface because of its low surface energy. For binders with S*>1.0, the final surface is always very mechanically weak, with a powdery consistency, because F-POSS is completely immiscible with such polymeric materials. Green circles in FIG. 1D denote surfaces that remain superhydrophobic after mechanical abrasion. It appears that these mechanically durable SHSs only occur when a binder exhibits partially miscibility with F-POSS (S*<1.0), in other words, a durable SHS with S*>1.0 is not observed. Finally, increasing an amount of F-POSS within a sprayed blend is not always efficacious. As the polymeric material/binder can be much more mechanically resilient than the F-POSS molecules, any excess F-POSS within the blend, beyond what is required to achieve superhydrophobicity (P*<1.0), can lower the overall durability. For example, a perfluorinated polyether, PFPE, remained superhydrophobic after abrasion with 25 wt. % F-POSS, but not with 35 wt. % F-POSS, although the S* and P* values are equivalent. As will be appreciated, such amounts may vary based on the materials in each individual system. Overall, choosing components that satisfy S*<1.0 helps ensure that the final surface will be durable, and choosing a correct ratio of the components in the material such that P*<1.0 provides a surface that is highly water repellent.

In various aspects, the present disclosure contemplates a durable superhydrophobic component comprising a surface having a superhydrophobic material exhibiting an apparent advancing dynamic contact angle of greater than or equal to about 150° for water and a roll-off angle of less than or equal to about 15° for water. Thus, such a durable superhydrophobic material may continue to exhibit the apparent advancing dynamic contact angle ≥150° and a roll-off angle of ≤15° after at least about 100 abrasion cycles or after any of the abrasion cycles discussed above, for example, optionally after at least about 400 abrasion cycles or optionally after at least 1,000 abrasion cycles, by way of non-limiting example. In certain aspects, the superhydrophobic material has a contact angle hysteresis of less than or equal to about 3° for water after at least 1,000 abrasion cycles or after any of the abrasion cycles discussed above.

In certain variations, an average thickness of the durable superhydrophobic material on a surface of the component may be greater than or equal to about 1 µm, optionally greater than or equal to about 1.5 µm, optionally greater than or equal to about 2 µm, optionally greater than or equal to about 2.5 µm, optionally greater than or equal to about 3 µm, optionally greater than or equal to about 3.5 µm, optionally greater than or equal to about 4 µm, optionally greater than or equal to about 4.5 µm, optionally greater than or equal to about 5 µm, optionally greater than or equal to about 10 µm, optionally greater than or equal to about 50 µm, optionally greater than or equal to about 100 µm, optionally greater than or equal to about 500 µm, and in certain variations, greater than or equal to about 1 mm.

In certain aspects, the surface on which the superhydrophobic material is disposed (e.g., deposited) has a superhydrophobic potential (P*) less than or equal to about 1. In other aspects, the superhydrophobic material comprises a low surface energy material and a polymeric material, where a miscibility parameter (S*) for the low surface energy material and the polymeric material is less than or equal to about 1, optionally greater than or equal to about 0.4 and less than or equal to about 0.9.

In certain aspects, the superhydrophobic material has less than or equal to about 40% by mass of the low surface energy material and greater than or equal to about 60% by mass of the polymeric material, optionally less than or equal to about 35% by mass of the low surface energy material and greater than or equal to about 65% by mass of the polymeric material, optionally less than or equal to about 30% by mass of the low surface energy material and greater than or equal to about 70% by mass of the polymeric material, optionally less than or equal to about 25% by mass of the low surface energy material and greater than or equal to about 75% by mass of the polymeric material, optionally less than or equal to about 20% by mass of the low surface energy material and greater than or equal to about 80% by mass of the polymeric material, optionally less than or equal to about 15% by mass of the low surface energy material and greater than or equal to about 85% by mass of the polymeric material. In certain aspects, the superhydrophobic material has greater than or equal to about 10% to less than or equal to about 20% by mass of the low surface energy material and greater than or equal to about 80% to less than or equal to about 90% by mass of the polymeric material. For example, the superhydrophobic material may comprise greater than or equal to about 10% to less or equal to about 20% by mass of the low surface energy material and greater than or equal to about 80% to less or equal to about 90% by mass of the polymeric material.

In certain variations, the low surface energy material may be a polymer selected from the group consisting of: octakis (1H, 1H,2H,2H-heptadecafluorodecyl) polyhedral oligomeric silsesquioxane (F-POSS), octakis(1H,1H,2H,2H-tridecafluorooctyl) polyhedral oligomeric silsesquioxane, octaisobutyl polyhedral oligomeric silsesquioxane (OibPOSS), octakis(1H,1H,2H,2H-nonafluorohexyl) polyhedral oligomeric silsesquioxane, alkanes having 18 or more carbon atoms, eicosane, and combinations thereof. In certain aspects, the low surface energy material comprises octakis (1H,1H,2H,2H-heptadecafluorodecyl) polyhedral oligomeric silsesquioxane (F-POSS).

In other variations, the low surface energy material may be a plurality of low surface energy particles selected from the group consisting of: fluoro-functionalized silica particles, alkyl-functionalized silica particles, polydimethylsiloxane-functionalized silica particles, polytetrafluoroethylene (PTFE) particles, perfluoropolyether (PFPE) particles, polydimethylsiloxanes (PDMS) particles, polystyrene particles, polyethylene particles, and combinations thereof. In one variation, the low surface energy particles may be fluoro-functionalized silica particles.

As such, the low surface energy material may be selected from the group consisting of: octakis(1H, 1H,2H,2H-heptadecafluorodecyl) polyhedral oligomeric silsesquioxane (F-POSS), octakis(1H,1H,2H,2H-tridecafluorooctyl) polyhedral oligomeric silsesquioxane, octaisobutyl polyhedral oligomeric silsesquioxane (OibPOSS), octakis(1H,1H,2H, 2H-nonafluorohexyl) polyhedral oligomeric silsesquioxane, alkanes having 18 or more carbon atoms, fluoro-functionalized silica particles, alkyl-functionalized silica particles, polydimethylsiloxane-functionalized silica particles, polytetrafluoroethylene (PTFE) particles, perfluoropolyether (PFPE) particles, polydimethylsiloxanes (PDMS) particles, polystyrene particles, polyethylene particles, and combinations thereof.

The polymeric material may be selected from the group consisting of: polydimethylsiloxane (PDMS), polyurethane (PU), fluorinated polyurethane (FPU), perfluoropolyether (PFPE), cyanoacrylate, ethyl-cyanoacrylate, chlorinated rubber, natural rubber, epoxy, polystyrene, polyvinyl chloride, polyethylene, polypropylene, polyisobutylene, polyisoprene, polymethyl methacrylate, polyvinylidine fluoride, polyethylene terephthalate, polyvinyl ether, polyvinyl acetate, cellulose acetate, ethyl cellulose, and combinations thereof. In certain variations, the polymeric material may be selected from the group consisting of: polydimethylsiloxane (PDMS), polyurethane (PU), fluorinated polyurethane (FPU), perfluoropolyether (PFPE), cyanoacrylate, ethyl-cyanoacrylate and combinations thereof.

In one variation, the superhydrophobic material comprises a low surface energy material comprising octakis(1H, 1H,2H,2H-heptadecafluorodecyl) polyhedral oligomeric silsesquioxane (F-POSS) and a polymeric material comprising fluorinated polyurethane (FPU).

In other aspects, the present disclosure provides a method of making a durable superhydrophobic component comprising spraying a substrate with a blend of a low surface energy material and a polymeric material precursor. A miscibility parameter (S*) for the low surface energy material and the polymeric material is less than or equal to about 1. The spraying forms a superhydrophobic layer on the substrate having an apparent advancing dynamic contact angle of greater than or equal to about 150° for water and a roll-off angle of less than or equal to about 15° for water.

Various embodiments of the inventive technology can be further understood by the specific examples contained herein. Specific examples are provided for illustrative purposes of how to make and use the compositions, devices, and methods according to the present teachings and, unless explicitly stated otherwise, are not intended to be a representation that given embodiments of this invention have, or have not, been made or tested.

Example A

Materials

All solvents, pre-polymers, and crosslinking agents are used as-received. Fluorinated solvents used include HCFC-225ca/cb (ASAHIKLIN-225™, commercially available from Asahi Glass Co.) and HFC-43-10mee (VERTREL XF™, from DuPont). Poly(methyl methacrylate) (PMMA), polystyrene (PS) and polyisobutylene (PIB) are purchased from Scientific Polymer. Luxecolor 4FVBA fluorinated polyol resin (55% solids in n-butyl acetate) is purchased from Helicity Technologies, Inc. Isocyanate crosslinkers DESMODUR N3200™ and WANNATE HMDI™ (4,4'-Diisocyanato-methylenedicyclohexane) are provided by Bayer MaterialScience, A.G. and Wanhua Chemical Group Co., Ltd. respectively. Crosslinker ratios are 9.7 and 3.4 wt. % respectively. Propylene glycol, a chain-extending agent that increases the modulus of the final cross-linked network, is obtained from MP Biomedicals, LLC. A polyurethane elastomer (VYTAFLEX 40™) is purchased from Smooth-On, Inc., and is prepared according to manufacturer directions. Polydimethylsiloxane elastomer is commercially available from Dow Corning SYLGARD 184™, where a 10:1 base:crosslinker ratio is used according to manufacturer directions. Acrylate terminated perfluoropolyether resin (CN4001, purchased from Sartomer USA, LLC) is mixed with 5 wt. % radical photoinitiator (IRGACURE 2022™, provided by BASF Corporation) to yield a UV curable fluorinated polymer matrix. Cyanoacrylate adhesive used is 3M SCOTCH-WELD SF100™. Two-part epoxy adhesive (Selleys ARALDITE™ 90 seconds) is used in an approximate 1:1 volume ratio of the components, per manufacturer instructions.

Fluorodecyl polyhedral oligomeric silsesquioxane is prepared by condensing 1H,1H,2H,2H-Heptadecafluorodecyl-triethoxysilane (Gelest, Inc.) as previously reported in Mabry, J. M. et al., "Fluorinated polyhedral oligomeric silsesquioxanes (F-POSS)," Angew. Chem. Int. Ed. Engl., 47, 4137-4140 (2008).

Coating Sample Fabrication

Spray coating solutions are prepared by solubilizing F-POSS, pre-polymer, and cross-linker (if applicable) at an overall solution concentration of 100 mg/mL. The weight fraction of F-POSS in the total solution is varied from 0 to 50%. The solvents used are: pure VERTREL XF™ (for FPU and PFPE), pure AK-225 (for SF100, PMMA and PDMS), 50:50 Chloroform: VERTREL XF™ for VYTAFLEX 40™, PS and ARALDITE™ epoxy and 50:50 AK-225:Hexane for PIB. No significant effect on spray coating morphology is observed between these solvents as they have similar volatility and surface tension.

The polymer-F-POSS solutions are applied to 10 cm×10 cm 6061 aluminum sheets with an ATD Tools 6903 high-volume-low-pressure spray gun. Spray coated samples are held at room temperature for at least one day and then cured as necessary prior to further testing (polyurethanes: 80° C. two days; PDMS: 150° C. 1 h; epoxy and cyanoacrylate: room temperature at least 2 hours; PFPE acrylate resin: 15 min simultaneous exposure to 254 and 365 nm UV mercury lamp irradiation under $N_2$ atmosphere).

Hansen Solubility Parameter Studies

F-POSS miscibility in the polymer binders is analyzed with the aid of the HSPiP software package and associated database of Hansen solubility parameters. All solvents are used without further purification, including acetone, THF, chloroform, ethylene glycol, toluene, cyclohexane, hexane, dodecane, DMSO, ethanol, n-butyl acetate, MEK and o-fluorotoluene (Fisher), as well as 1-hexanol chlorobenzene, perfluorodecalin, hexafluorobenzene, p-chlorobenzotrifluoride, diisopropylamine and pentafluorobutane (Sigma Aldrich). Additionally DI water, AK-225 and VERTREL XF™ are used.

Crosslinked polymers and elastomers are swollen in a selected number of solvents until a consistent mass is achieved. Samples are weighed and then the solvent is extracted using a vacuum oven at 100° C. The advantageousness of a given solvent is determined by ranking the swelling ratio (divided by the mass of the solvent) from 1 to 6, with 1 being solvents that swell the polymer the most. These are then input into the HSPiP software in order to determine the center and radius of the given system, or to determine other solvents necessary to better define the radius of the Hansen sphere.

The Hansen sphere for F-POSS is determined only using fluorinated solvents, as the fluorine-fluorine interaction is important in solubilizing highly fluorinated compound. As an example, hexafluorobenzene and dodecane have the exact same Hansen parameters and similar molecular volumes. However, F—POSS is completely insoluble in dodecane even at 1 mg/mL, whereas F-POSS is soluble up to 800 mg/mL in hexafluorobenzene. Thus, rather than confounding the results by including alkanes and other proximal molecules, only fluorinated solvents are used.

Along similar lines, the Hansen sphere for F-POSS is found for various solution concentrations. Although the Hansen radius is known to be weakly dependent on concentration, a strong dependence is found when evaluating fluorinated systems such as F-POSS.

Wettability Measurements

Advancing and receding contact angle measurements are obtained via the sessile drop method using a Ramé-Hart 200 F1 contact angle goniometer. A water droplet suspended from a vertical dispensing needle is brought into contact with the substrate, and its volume increased and decreased to obtain the advancing and receding contact angles. A circular drop profile on the live video feed in the DROPImage Advanced software is used to obtain contact angle data. At least three points are measured for each surface at each abrasion condition. Droplet roll-off angles are obtained by placing at least five 25 μL water droplets distributed across the surface with a micropipette, and using the manual tilting stage of the goniometer to gradually increase the angle. The tilt angle is recorded when each droplet rolled off, and the average across the droplets is calculated. Droplets that did not roll off are recorded as $\theta_{Roll-off}=90°$ for averaging purposes. The large error bars in some of the abraded samples in FIGS. 2A-2D arose from averaging spots that wet with spots that remained superhydrophobic.

Abrasion Testing

Abrasion testing based on ASTM standard D4060 is performed with a Taber Model 5135 Rotary Abraser with CS-10 resilient abrasive wheels. 250 g weights are placed on the rear of the wheel arms such that the applied normal load is about 60 g, and the sample is then rotated relative to the freely spinning abrasion wheels such that a shearing abrasion action occurs. Excess debris is removed continuously with a vacuum nozzle. The result is a circular region on the sample that is consistently mechanically damaged.

The manual sandpaper abrasion test performed is automated using a Taber Model 5750 Linear Abraser. A 2.5×2.5 cm spray coated sample is mounted facing downwards on the reciprocating head, and brought in contact with 240 grit sandpaper, with an applied load of about 250 g. The sample is then moved under load on the static sandpaper, and the test is continued until water droplets are pinned. Water roll-off angles are measured periodically to confirm the retention of superhydrophobicity.

Imaging and Metrology

Scanning electron micrographs are obtained with a Philips XL30 SEM after sputter coating the samples with gold to reduce charging effects.

Two-dimensional height-maps of the surfaces are obtained with an Olympus LEXT OLS4000 3D Laser Measuring Microscope. This data is subsequently analyzed to yield statistical geometric parameters using MATLAB.

Thermal Degradation Analysis

A sample of FPU+15 wt. % F-POSS is placed on a hot plate at temperatures from 150-425° C. in increments of 25° C., 1 hour per temperature point. After each baking step, the advancing, receding and roll-off angles are measured. To correlate the onset of degradation of the Cassie state with chemical degradation of the sample, thermogravimetric analysis is performed with a TA Instruments Discovery Series TGA using a 6 mg sample scraped from a the same spray-coated surface. This sample is heated from 25-600° C. at 10° C./min in a 10 mL/min $N_2$ gas purge flow while continually monitoring its mass.

UV Exposure

A sample of FPU+15 wt. % F-POSS is placed under 254 nm UVC at a distance of 5 cm. The contact angles are measured after five hours of continuous exposure.

$O_2$ Plasma Exposure

A sample of FPU+15 wt. % F-POSS is exposed to $O_2$ plasma (Harrick Plasma PDC-001) using RF source power of 30 Watts and a pressure of ~200 mTorr for 20 min. Contact angles are measured to verify the complete wetting of the surface. To recover the water repellency, the coated surface is placed on a hotplate at a certain temperature (80° C. or 150° C.). For the time dependent recovery, the substrate is removed from the hotplate after temporal increments and the contact angles are measured. For the $O_2$ plasma cycling, the substrate is placed on a 150° C. hotplate for 20 min before measuring contact angles. The $O_2$ plasma exposure followed by the 150° C. recovery is denoted as one cycle.

Corrosion Testing

Corrosion testing is done in accordance to ASTM B117. Briefly, steel tabs measuring 25 mm×75 mm are spray-coated at with the FPU+15 wt. % F-POSS coating. The coated pieces are hung in a salt-spray fog chamber (Bemco Inc.) kept at 35° C. for 200 hours. A 25 mm scratch is made along the length of the coating so that the steel underneath is exposed. After the accelerated corrosion, the contact angles are measured.

Compression Testing

Compression testing is done using a Carver 4350 compression molder with a 30 ton capacity. Samples of known dimensions are placed between aluminum plates and a certain force is applied and held for 60 seconds. The contact angles are then measured immediately following compression. The coating is then self-healed on a 100° C. hotplate for 5 minutes, and contact angles are recorded again.

Breakthrough Pressure Testing/Droplet Impact

Pressure stability is measured both statically and dynamically. Static pressure testing is done using a pressure tank (TCP Global) with a 7 cm head of DI water. The pressure is regulated using compressed air. Samples are submerged and the pressure is raised to the set level for 60 seconds at a ramp rate of no more than 5 psi per second. After the pressure is released, samples are removed to determine if they remained dry. Due to the inhomogeneity of the surfaces, breakthrough is considered to have occurred when the sample is fully wetted upon removal from the water tank.

Dynamic pressure testing is done using impacting water droplets and a high speed camera (Fastec Imaging HiSpec 1) at 2000 fps. The breakthrough pressure is considered when the droplet became pinned on the surface upon impact. As the maximum droplet height for our experimental setup is 1.7 m, corresponding to an impact velocity of 5.7 m/s, many surfaces exhibited breakthrough pressures too high to measure using droplet impact.

As noted above, one way of determining durability of SHSs prepared in accordance with certain aspects of the present disclosure is by testing mechanical abrasion. For example, a rotary TABER™ abrasion device can be used to evaluate the mechanical durability of sprayed superhydrophobic material comprising a blend of a polymeric material and a low surface energy material, like F-POSS. 100 abrasion cycles appears to sufficiently differentiate durable and non-durable SHSs, e.g., non-durable surfaces are either completely abraded away or water wets the abraded coating. Only surfaces that exhibit $\theta_{Roll-off}$<15° after 100 abrasion cycles are shown as green circles in FIG. 1D. All such surfaces exhibit partial miscibility with F-POSS (0≤S*≤1.0). Durability testing is continued for certain partially miscible polymeric material binders: a fluorinated polyurethane (FPU, S*≈0.6), a perfluoropolyether (PFPE, S*≈0.5) and an ethyl-cyanoacrylate superglue (SF-100, S*≈0.7). Their durability after abrasion is compared to three commercially available, purportedly durable, superhydrophobic materials: ULTRA EVERDRY®, WX-2100, and NEVERWET®. ULTRA EVERDRY® (sold by Ultratech) and NEVER-WET® (sold by Rustoleum) are compositionally believed to be PDMS-based materials with functionalized silica distributed therein. WX-2100 is commercially available from Cytonix and is believed to be a fluorourethane-based material. See FIG. 2A. None of the commercial coatings maintained a low $\theta_{Roll-off}$ after 100 abrasion cycles. However, superhydrophobic surfaces created in accordance with certain aspects of the present disclosure do exhibit such durability after 100 abrasion cycles. Such superhydrophobic surfaces are also believed to be able to withstand other metrics of mechanical durability, for example, superhydrophobic materials prepared in accordance with certain aspects of the present disclosure did not experience degradation of high contact angle when abraded with sandpaper along a total length of 800 cm. Certain superhydrophobic surfaces prepared in accordance with the present disclosure maintain high contact angles, as well as low roll off angles, even after 1 kilometer (100,000 cm) of abrasion using the same sandpaper and applied load, as shown in FIG. 3D.

FIG. 2B shows additional abrasion testing for durable polymeric material and F-POSS blends, which shows them to be extraordinarily resilient to mechanical wear. All other evaluated SHSs (that are not completely removed) became wettable within 100 abrasion cycles, whereas the non-wetting properties of inventive superhydrophobic surfaces endured significantly longer. When blended with F-POSS, coatings incorporating PFPE, SF-100 and FPU polymeric material binders remained superhydrophobic for up to 400, 500, and 1,000 Taber abrasion cycles, respectively. These systems only became wettable once the entire coating is abraded away. A 100 µm thick superhydrophobic material coating comprising FPU and F-POSS maintained water repellency even when >90 µm of its thickness is removed. This resilience is similarly observed for the PFPE and SF-100 F-POSS blends, but these blends survived fewer abrasion cycles because of the FPU binder's greater resistance to mechanical wear. Abrasion of smooth FPU and F-POSS blends and other partially miscible systems (S* 0.4-0.9) deposited by alternate means confirm that the abrasion process did not induce superhydrophobicity (P*≈1.3-1.9 after abrasion). Rather, only the SHSs fabricated from partially miscible components maintained P*<1.0 (FIG. 2C) during abrasion, whereas miscible (S*<0) and immiscible (S*>1.0) systems did not.

As further demonstration that partial miscibility of the low surface energy material and the polymeric material (e.g., binder) provides mechanically durable SHSs, the FPU is chain extended by incorporating propylene glycol into the crosslinked network. The chain-extended FPU exhibits a three-fold increase in elastic modulus, and a 12% reduction in mass loss during abrasion of the smooth polymeric binder (no F-POSS), as compared to unmodified FPU. However, the increased number of urethane linkages alters the Hansen sphere for the crosslinked network, changing the miscibility with F-POSS from S* approximately 0.6 to S* approximately 1.1 (although P* only shifted from P*$_{FPU}$=0.48 to P*$_{FPU-CE}$=0.56). As such, whereas a sprayed blend of FPU+ 15 wt. % F-POSS remained superhydrophobic after 1,000 abrasion cycles, a sprayed blend of the chain extended FPU+15 wt. % F-POSS is no longer superhydrophobic after only 100 abrasion cycles as shown in FIG. 2B. This counterintuitive and surprising result emphasizes the fact that the polymeric material binder with select miscibility (0≤S*≤1.0), not the most mechanically durable polymeric binder, can yield the most mechanically durable superhydrophobic surfaces. For example, two of the three commercial SHSs evaluated in FIG. 2A appear to include and at least in part rely on particular fillers (which are intrinsically more durable than polymeric materials) to achieve water repellency. Such systems may exhibit a greater mechanical resilience (e.g., less mass loss during abrasion), but the water repellency is quickly removed as shown in FIG. 2A.

In certain aspects, a blend of the FPU polymeric material (binder) and 15 wt. % F-POSS provides a particularly durable and robust superhydrophobic material. This superhydrophobic coating takes advantage of the surface migration of F-POSS and the elastomeric nature of the FPU. As such, the coating has the capability to both chemically and physically self-heal. For example, the as-abraded coating maintains $\theta_{Roll-off}$ less than or equal to about 15° up to about 1,000 abrasion cycles. Beyond this, $\theta_{Roll-off}$ increases with the number of abrasion cycles. But if the superhydrophobic coating is placed on a hotplate for a few minutes so that heat is applied thereto, the water repellency is easily restored as shown in FIG. 3A. The self-healing FPU and F-POSS coating maintained $\theta_{Roll-off}$<15° over 5000 abrasion cycles.

Mechanical wear can also affect a SHS's capillary resistance to wetting under pressure. Although the Cassie state can be stable if P*<1.0, a pressure-induced wetting transition is usually irreversible without some form of energy input. To evaluate pressure resistance, a self-healed FPU and F-POSS superhydrophobic coating is completely submerged in a pressurized water tank and then observed for when wetting occurs. A breakthrough pressure, $P_b$, of this coating is initially about 100 kPa and never decreases below 50 kPa, even after 5,000 abrasion cycles as shown in FIG. 2D. Remarkably, the pressure resistance increases to a maximum of $P_b$ approximately 310 kPa after 4,000 abrasion cycles, due to the decrease in $S_q$ with increasing abrasion. As such, even water droplets impinging the abraded surface at an impact velocity of about 6 m/s completely rebounded, leaving the surface dry (inset, FIG. 2C). Whereas often SHSs only maintain their high contact angle after mechanical damage, the superhydrophobic surfaces prepared in accordance with the present teachings preserve all their advantageous, water-repellant properties after harsh mechanical abrasion.

The self-healing nature of a combination of FPU and F—POSS is further evaluated by subjecting it to many extreme exposures that completely remove the water repellency of the superhydrophobic coating. Quite extraordinarily and unexpectedly, after a mild thermal treatment, both the surface texture and low surface energy could be fully recovered. For example, in one variation according to the present disclosure, the superhydrophobic coating could be significantly compressed (325 MPa) without fracturing, although flattening the texture elements completely removed its porosity (P* 2.0, FIG. 3B). Nevertheless, upon heating, such damage is reversible, and the superhydrophobic coating quickly recovered to its original state (P* approximately 0.6). The superhydrophobic coatings also self-heal after other physical challenges as shown in FIG. 3D, including knife scratching the surface, sonication in hexane, TABER™ abrasion cycles, and sandpaper abrasion (upper 5 bars in FIG. 3D).

As discussed above, the low surface energy of a low surface energy material like F-POSS causes it to migrate to the solid/air interface, imparting F-POSS and polymer blends with the potential for chemical self-healing as well. For example, oxygen plasma, which has the capability of hydrolyzing F-POSS, renders the FPU and F-POSS coating superhydrophilic within minutes ($\theta^*=0°$, although P* remained unchanged). However, upon heating, the low surface energy is fully restored as shown in FIG. 3C. The time to full superhydrophobic recovery decreases with increasing temperature, consistent with a diffusion-controlled process. Superhydrophobic coatings are repeatedly $O_2$ plasma treated, where the water repellency is fully recovered even after 10 successive treatments (inset, FIG. 3C). Chemical self-healing is also observed after acid/base submersion, baking at 325° C. for 3 days, a fluoro-solvent wash, 5 hours of UVC exposure, and accelerated corrosion testing (lower 7 bars in FIG. 3D). After self-healing following all the above exposures, P*>1.0 is never observed. Consequently, the Cassie state remains energetically preferred, and the angle at which water rolls off the surface is always observed to be <15°.

Thus, mechanical or chemical damage of the superhydrophobic coating caused by environmental conditions, fatigue, stress, or impact over time, can cause changes to the polymer microstructure which can lead to changes in wettability. Notably, the self-healing superhydrophobic coating has an initial wettability, for example an initial contact angle of greater than or equal to about 150° and an initial roll-off angle of less than or equal to about 15° for water. After damage is inflicted to the superhydrophobic coating, the wettability may change substantially, for example, the contact angle may be less than or equal to about 150° and/or the roll-off angle may be greater than or equal to 15°.

In various aspects, the superhydrophobic coating described herein is capable of self-healing and may undergo one or more healing cycles, e.g., 1-2 healing cycles, optionally 1-3 healing cycles, optionally 1-5 healing cycles, optionally 1-7 healing cycles, optionally 1-10 healing cycles, optionally 1-15 healing cycles, optionally 1-20 healing cycles, by way of non-limiting example. As used herein, "healing cycle" refers to a period or event where at least a portion of damage in the superhydrophobic coating is repaired, for example, by facilitating realignment of the low surface energy material within the superhydrophobic coating. Self-healing may involve heating the material to a temperature that is above the melting point or glass transition point of the polymeric material. In certain variations, a healing cycle may involve heating the component having the damaged or underperforming superhydrophobic coating to a temperature of greater than or equal to about 50° C. to less than or equal to about 400° C., optionally greater than or equal to about 50° C. to less than or equal to about 150° C., for a period of greater than or equal to about 1 minute to less than or equal to about 300 minutes, optionally for greater than or equal to about 2 minutes to less than or equal to about 100 minutes. The successive damage/recovery cycles may exceed ten or more cycles, highlighting the robust nature of the self-healing superhydrophobic materials of the present disclosure.

Thus, following damage (e.g., abrasion or chemical attack) to the self-healing superhydrophobic coating, the coating is capable of recovering at least a portion of an initial superhydrophobic wettability. In particular, the self-healing superhydrophobic coating described herein is capable of recovering at least about 70%, optionally at least about 80%, optionally at least about 90%, optionally at least about 95%, optionally at least about 96%, optionally at least about 97%, optionally at least about 98%, optionally at least about 99%, optionally at least about 99.5%, and in certain variations, about 100% of the initial contact angle of greater than or equal to about 150° and/or the initial roll-off angle of less than or equal to about 15° for water. Ideally, the superhydrophobic coating recovers both the initial contact angle and/or roll-off angle at such levels after a self-healing treatment. In certain preferred variations, after the self-healing sequence, the superhydrophobic coating is restored to a subsequent contact angle of greater than or equal to about 150° and/or a subsequent roll-off angle of less than or equal to about 15° for water. As noted above, ideally both the subsequent contact angle and the subsequent roll-off angle are restored to such levels after a self-healing sequence.

In certain aspects, the present disclosure provides a self-healing superhydrophobic component comprising a self-healing superhydrophobic material. The self-healing superhydrophobic material comprises a low surface energy material and a polymeric material. The self-healing superhydrophobic material exhibits an apparent advancing dynamic contact angle of greater than or equal to about 150° for water and a roll-off angle of less than or equal to about 15° for water. In certain aspects, the self-healing superhydrophobic material is capable of recovering superhydrophobic properties after damage occurs to recover the apparent advancing dynamic contact angle of greater than or equal to about 150° for water and the roll-off angle of less than or equal to about 15° for water.

In certain aspects, the self-healing superhydrophobic material has a superhydrophobic potential (P*) less than or equal to about 1. The self-healing superhydrophobic material comprises a low surface energy material and a polymeric material, wherein a miscibility parameter (S*) for the low surface energy material and the polymeric material is less than about 1. Where the miscibility (S*) parameter is less than about 1.0, a portion of the low surface energy material is distributed through the bulk of the material layer (excess low surface energy material remains in the bulk of the coating material due to partial miscibility), rather than being entirely distributed at the surface of the coating at the outset.

The low surface energy material may be selected from the group consisting of: octakis(1H,1H,2H,2H-heptadecafluorodecyl) polyhedral oligomeric silsesquioxane (F-POSS), octakis(1H,1H,2H,2H-tridecafluorooctyl) polyhedral oligomeric silsesquioxane, octaisobutyl polyhedral oligomeric silsesquioxane (OibPOSS), octakis(1H,1H,2H,2H-nonafluorohexyl) polyhedral oligomeric silsesquioxane, solid alkanes having 18 or more carbon atoms, such as eicosane ($C_{20}H_{42}$), fluoro-functionalized silica particles, alkyl-functionalized silica particles, polydimethylsiloxane-functionalized silica particles, polytetrafluoroethylene (PTFE) particles, perfluoropolyether (PFPE) particles, polydimethylsiloxanes (PDMS) particles, polystyrene particles, polyethylene particles, and combinations thereof.

The polymeric material may be selected from the group consisting of: polydimethylsiloxane (PDMS), polyurethane (PU), fluorinated polyurethane (FPU), perfluoropolyether (PFPE), cyanoacrylate, ethyl-cyanoacrylate, chlorinated rubber, natural rubber, epoxy, polystyrene, polyvinyl chloride, polyethylene, polypropylene, polyisobutylene, polyisoprene, polymethyl methacrylate, polyvinylidine fluoride, polyethylene terephthalate, polyvinyl ether, polyvinyl acetate, cellulose acetate, ethyl cellulose, and combinations thereof. In certain variations, the polymeric material may be selected from the group consisting of: polydimethylsiloxane (PDMS), polyurethane (PU), fluorinated polyurethane (FPU), perfluoropolyether (PFPE), cyanoacrylate, ethyl-cyanoacrylate and combinations thereof.

The self-healing superhydrophobic material may comprise less than or equal to about 40% by mass of the low surface energy material and greater than or equal to about 60% by mass of the polymeric material, for example, optionally greater than or equal to about 10% to less than or equal to about 20% by mass of the low surface energy material and greater than or equal to about 80% to less than or equal to about 90% by mass of the polymeric material.

In certain variations, the low surface energy material comprises octakis(1H,1H,2H,2H-heptadecafluorodecyl) polyhedral oligomeric silsesquioxane (F-POSS) and the polymeric material comprises fluorinated polyurethane (FPU), where the self-healing superhydrophobic material comprises less than or equal to about 15% by mass of the F-POSS and greater than or equal to about 85% by mass of the FPU.

Accordingly, miscibility between the low surface energy materials, such as hydrophobic fillers like F-POSS, and polymeric materials (e.g., binders) permits control over formation of surface texture during spray coating in order to fabricate robust superhydrophobic surfaces. The S* parameter quantifies the miscibility between the two sprayable components (the low surface energy material and the polymeric material), and the P* parameter characterizes the stability of the non-wetted state. Superhydrophobic surfaces in accordance with the present teachings have an S*<1.0 to help ensure mechanical durability, and P*<1.0 to provide a robust non-wetting state. Utilizing these two design criteria, superhydrophobic surfaces with unprecedented mechanical durability are thus provided by the present disclosure. Some of these surfaces also exhibit a self-healing nature, both chemically and physically, for example, those having a miscibility (S*) parameter of less than about 1.0 where a portion of the low surface energy material is distributed through the bulk of the material layer (excess low surface energy material in the bulk due to partial miscibility), rather than being entirely distributed at the surface. Further, the glass transition temperature of the polymeric material binder is less than the degradation point temperature of the low surface energy material. Thus, these self-healing compositions are able to fully recover their superhydrophobicity after a wide variety of extreme chemical and physical exposures.

In other aspects, the present disclosure provides a component comprising a surface that is superhydrophobic and reduces drag in turbulent flow conditions. Turbulent flow depends upon the system in which the component is disposed and moves, thus, turbulent flow generally occurs where Reynolds numbers are relatively high, inertial forces dominate, and flow instabilities occur. Reynolds numbers associated with turbulent flow may vary depending on different factors. Turbulent flow conditions for two canonical geometries (I-II) using the corresponding Reynolds number for each flow geometry are as follows. For situation (I) having an external turbulent boundary layer, for incompressible flow over a smooth flat plate, transition from laminar to turbulent flow typically occurs at a length Reynolds number of 500,000. Freestream flow disturbances and flow tripping may cause a premature or delayed transition. For situation (II) with internal flows, two subcategories (a)-(b) are as follows. In a first category (a) for geometries with a high aspect ratio channel (Width/Height >4), the transition to fully-developed turbulent channel flow is generally accepted to occur at or before a height based Reynolds number of 4,000. Flow disturbances and tripping may result in an earlier transition, closer to a height based Reynolds number of 3,000. In a second category (b), for a pipe flow or a low aspect ratio (Width/Height <4) duct/channel, transition to fully-developed turbulent flow is generally accepted to occur at a diameter based Reynolds number of 2,300, where the diameter is the diameter of the pipe or the hydraulic diameter of the duct. Flow disturbances and tripping may result in a premature or delayed transition. Thus, Reynolds numbers associated with turbulent flow conditions may vary depending on the system.

As background, a significant amount of fuel consumed by marine vehicles is expended in overcoming frictional drag. Any significant reduction in this frictional drag would result in noteworthy economic savings and reduced environmental impact. For example, in 2012, the U.S. alone used over seven billion gallons of fossil fuels to power marine vessels. Marine fuel consumption is predicted to double between 2010 and 2030, and nearly 60% of this fuel will be expended to overcome frictional drag. As such, materials and methods that can effectively reduce the drag on marine vehicles will have an enormous, worldwide impact, both economically and environmentally.

Superhydrophobic surfaces (SHSs) have shown promise in reducing drag in small-scale applications and/or in laminar flow conditions. The efficacy of these surfaces in reducing drag in turbulent flow, however, is not well characterized or well understood. The extension of friction drag reduction to wall-bounded turbulent flows, e.g., many flow conditions that are relevant to mechanical, naval, and hydraulic infrastructure, has not been straightforward or successfully resolved. Both the efficacy and mechanism of these potentially drag-reducing surfaces have been previously debated. Furthermore, durability and robustness of any drag reducing materials in turbulent flow is important for such applications. Large, scalable SHSs in turbulent flow have shown drag increase, no change, or 10% to 30% drag reduction under certain conditions. Current technologies, such as riblets, polymers, or air-layer drag reduction have yielded only modest (5-20%) reductions of total drag or require significant mass and/or energy inputs. Thus, there is a strong need to develop methods for significantly reducing drag in conditions of naval relevance, i.e. high-Reynolds number turbulent flows.

In various aspects, the present disclosure provides selection of physical properties that enable a superhydrophobic surface (SHS) to reduce drag in not only laminar flow, but also turbulent flow. Further provided are scalable and mechanically robust SHSs that produce, for the first time, significant (e.g., greater than or equal to about 50%) friction drag reduction in fully-developed, turbulent channel flow, at what is believed to be the highest Reynolds numbers evaluated to-date.

As noted above, in certain aspects, SHSs are defined by an apparent contact angle θ* greater than or equal to about 150° and low contact angle hysteresis, Δ, the difference between the advancing and receding contact angles, $\theta_{adv}$ and $\theta_{rec}$, respectively. These high contact angles are achieved by trapping air pockets within the surface's texture, underneath the contacting water droplets as shown in FIG. 4A. Cassie and Baxter proposed that the apparent contact angle θ* is a weighted average between the contact angle on a chemically identical but smooth surface (the contact angle θ given by Young's relation), and air, which exhibits a perfect 180° contact angle, as shown in equation 6.

$$\cos \theta^* = r_\phi \phi_s \cos \theta + (1-\phi_s)\cos \pi \quad (6)$$

Here $\phi_s$ is the areal fraction of the surface that is wet by the liquid, and $r_\phi$ is a ratio of this wetted surface area to its projected surface area. Thus, a large contact angle can be achieved by a very small $\phi_s$, a very large $r_\phi$, or both.

When liquid flows over a solid surface, the usual boundary condition assumed is that the velocity of the liquid must match the velocity of the solid. This is typically referred to as the "no slip" boundary condition. However, SHSs possess a fraction of air $(1-\phi_s)$ at the liquid interface, which can have a non-zero interfacial velocity. Navier first proposed a slip velocity, $u_s$, in 1823, suggesting that the shear rate at the wall is proportional to $u_s$. For a two-dimensional flow, this is schematically depicted in FIG. 4B and can be described by:

$$u_s = \lambda_x \left|\frac{du}{dy}\right|, v_s = 0, w_s = \lambda_z \left|\frac{dw}{dy}\right| \quad (7)$$

where u, v and w are the velocity components in the streamwise (x), wall-normal (y) and spanwise (z) directions, and $\lambda_i$ is the slip length along direction i in FIG. 4B. Thus, SHSs can produce slip at the interface through the incorporation of entrapped air. Because less energy is lost to frictional dissipation, a non-zero us indicates a reduction in drag at the solid-liquid interface. For laminar flows, the drag-reducing ability of SHSs has been confirmed experimentally and computationally, for example, depending on the fraction of air $(1-\phi_s)$, drag reduction as high as 99% may be achieved.

However, the ability of SHSs to afford drag reduction in turbulent flow is not well-characterized or understood. Whereas small, micro-fabricated surfaces have shown drag reduction anywhere from 10% to 50% in laboratory settings, large, scalable SHSs have resulted in drag increase, no change, or around 10% to 30% drag reduction under certain conditions. In turbulent flow, there is an interaction between the near-wall region and the buffer region. The former is known as the viscous sublayer, which is dominated by viscous shear stresses, while the latter is dominated by turbulent momentum transfer. This interaction may be modified when micro-features are added to a surface. Additionally, significant momentum transfer is expected in the viscous sublayer due to the presence of the disparate liquid-air and liquid-solid interfaces causing mixed slip/no-slip boundary conditions that can exist on textured surfaces. These near-wall flows are complex due to the many turbulent structures, eddies and vortices that dominate the momentum transfer in the buffer region. Moreover, while slip in the direction of flow ($u_s \neq 0$) can result in drag reduction, slip in the spanwise direction ($w_s \neq 0$) can increase the intensity of these turbulent structures, and causing a drag increase. As a result, surfaces that reduce drag in laminar flow, where these additional flow features are absent, are not likely to continue reducing drag when exposed to turbulent flow.

Many previous studies have not reported contact angles, or only reported a static contact angle, providing no information on the contact angle hysteresis. Furthermore, nothing indicates how surfaces should be fabricated so as to maximize the drag reducing potential of a SHS in turbulence. Typically, reporting $\theta^*_{adv}$ and $\theta^*_{rec}$ has been considered sufficient to describe a SHS. However, as described further herein, while characterization of these angles is necessary, it may not be sufficient to describe surfaces capable of reducing drag in turbulent flow. Fully-turbulent, high-Reynolds number flows create large pressure fluctuations and high shear stresses. Such large surface pressures can displace the entrapped air pockets of a SHS if its capillary resistance is low i.e. only a small pressure is required to transition from the Cassie to the Wenzel state. Similarly, the high shear stresses can mechanically damage and detach any fragile texture elements of the SHS, again removing the entrapped air. Insufficient mechanical durability is one reason SHSs have previously not shown sustainable friction reduction in turbulent flow. Regardless, if the air remains within the interstices of a SHS, the surface may not reduce drag if the texture is not designed correctly as further addressed herein.

As the pressure increases on a SHS, the liquid-vapor interface moves into the air pockets, partially filling the surface texture, thereby increasing $\phi_s$ and perhaps $r_\phi$, depending on the surface geometry. According to equation 6, θ* must then decrease as shown in FIG. 5A. This has two important implications. First, the $\phi_s$ extracted from conventional measurements of $\theta_{adv}$ or $\theta_{rec}$ may be significantly different from the $\phi_s$ in a turbulent flow. Second, the wetted aggregate features that protrude into the flow, i.e. $r_\phi \phi_s$, may cause form drag, increase turbulent mixing, and/or enhance turbulent structures that negate any skin-friction drag reduction, resulting in a net increase in drag. Thus, only contact angles measured at the pressures expected during turbulent flow are relevant to turbulent skin-friction drag reduction as shown in FIG. 5B.

The Laplace pressure, $P_L$, within an azimuthally symmetric water droplet is given by $P_L=2\gamma R$, where γ is the surface tension of water and R is the radius of the droplet. By decreasing the size of a droplet used to measure contact angles, the values of $r_\phi$ and $\phi_s$ at higher pressures can be determined. Moreover, by measuring the exact surface topography, the size and shape of every wetted texture element can be calculated once the meniscus location under pressure is known. The form drag on each texture element may then be approximated by $$F_D = \tfrac{1}{2}\rho U^2 A C_d \quad (8)$$

where ρ is the density of water, U is the average flow speed in the vicinity of the texture element, A is the element's projected area in the flow direction, and $C_d$ is the drag coefficient based on the geometry of each element. On a SHS, if the sum of the forces due to form drag on the protruding texture elements exceeds the drag reduction due to the presence of the trapped air pockets, a net drag increase will result. This drag increase is a direct consequence of the meniscus height at pressure, and is independent of the $\theta^*_{adv}$ and $\theta^*_{rec}$ measured at low/atmospheric pressure. Computationally it has been shown that surfaces with $\phi_s$ approximately 0.1 exhibit the highest form drag in the fully wetted case. Moreover, the largest texture elements produce disproportionately high form drag. As such, a design consideration is to form a superhydrophobic surface that will not cause significant form drag in turbulent flow.

Example B

Fabrication

Surface no. 1 comprises an 80/20 wt. % blend of a fluorinated polyurethane (Helicity Inc.) and fluorodecyl polyhedral oligomeric silsesquioxane (F-POSS). F—POSS is prepared by condensing 1H,1H,2H,2H-Heptadecafluorodecyltriethoxysilane (Gelest Inc.) as previously reported in Mabry et al. The polyurethane is crosslinked using 3.4 wt. % 4,4'-Diisocyanato-methylenedicyclohexane (Wanhua Chemical Group Co.) All three above components are dissolved in VERTREL XF™ (Chemours) at an overall concentration of 200 mg/mL. The mixture is sonicated until it became completely transparent, approximately 30 seconds. 40 mL of the solution is sprayed onto a 1.2 m×0.1 m stainless steel substrate using an ATD Tools 6903 high volume-low pressure spray gun with compressed air at a pressure of 20 psi. The sample is then cured at 80° C. for 72 hours.

Surface no. 2 comprises a 50/50 wt. % blend of superglue (SF-100, 3M) and F-POSS. The two components are dissolved at a concentration of 50 mg/mL in Asahiklin-225 (Asahi Glass Co.) and sprayed using the same procedure as for surface no. 1. Surface no. 2 is cured at 50° C. for 60 minutes. The morphology of this system is altered in the following manner. To increase asperity roughness, a total spray solution of 120 mL is used. To decrease asperity roughness, the spray gun is replaced with a Paasche airbrush, as described previously.

Surface no. 3 comprises a 65/35 wt. % blend of the fluorinated polyurethane from surface no. 1 and fluoro-functionalized silica particles, approximately 50-100 nm irregular aggregates, the synthesis of which is reported elsewhere. The two components are dispersed at a concentration of 25 mg/mL in VERTREL XF™ and then 20 mL is sprayed following the same procedures as surfaces nos. 1-2. The surface is then cured at 80° C. for 72 hours.

Surface no. 4 comprises aluminum (Al) metal that is etched, boiled and subsequently functionalized with a fluoro-silane. The following procedure is modified from previously reported techniques in Yang, J. et al. Al sheets (McMaster) 8"×4"×⅛" are first etched in 2.5 M HCl (Fisher Scientific) for 20 minutes. Following etching, the samples are sonicated to remove residual Al flakes adhered to the surface. The etched Al is then boiled in deionized water for 20 minutes. Finally, the surface is exposed to 1H,1H,2H, 2H-Heptadecafluorodecyl triethoxysilane (Gelest Inc.) vapors overnight at 80° C. under vacuum. To span the full channel length, about 5 sheets are tiled together.

Surface Imaging

Scanning electron microscopy (SEM) is performed using a Phillips XL30 FEG. Samples are first sputtered with a gold-palladium mixture to avoid charging. Surface profilometry is performed using an Olympus LEXT interferometer with a step size of 1.25 m and an overall scan area of 2.5×2.5 mm. A minimum of three locations are averaged. Contact angles are measured using a Ramé-Hart 200 F1 contact angle goniometer with water droplets of decreasing diameter. Contact angle hysteresis is measured by increasing or decreasing the volume of water on the surface (low pressure measurement) or by tilting the stage until a 250 nL droplet rolled off the surface (higher pressure measurement). Here we assume $\theta_{adv}=\theta_{max}$ and $\theta_{rec}=\theta_{min}$. PIV data is processed using Lavision from DaVis.

Form Drag Calculations

The form drag is calculated using a custom MATLAB script as follows. The Cassie-Baxter relation is satisfied by taking a contour slice (the meniscus) from height-maps obtained using a LEXT interferometer. When the meniscus height results in a value of rpos that corresponds to the desired contact angle (found to be a function of pressure based on contact angle measurements), each texture element above the meniscus is analyzed. The height and area are recorded and the drag coefficient of the texture elements is determined to most closely match a triangular asperity. The fits allow the form drag to be approximated based on pressure and contact angle alone. Other statistical quantities are extracted from the height-maps such as the root-mean-squared roughness, k.

Four different SHSs are provided that all display $\theta^*>166°$ and $\Delta\theta<3°$, when measured using the conventional goniometric technique in FIG. 5C. Surface no. 1 is fabricated from a blend of a fluorinated polyurethane (FPU) and fluorodecyl polyhedral oligomeric silsesquioxane (F-POSS). The polyurethane is crosslinked using 4,4'-diisocyanato-methylenedicyclohexane. The blend is dissolved in VERTREL XF™ and sprayed onto 1.20 m×0.10 m stainless steel substrates shown in FIG. 5D. The sample is then cured at 80° C. for 72 hours.

Surface no. 2 is a blend of cyanoacrylate and F-POSS. The two components are dissolved in Asahiklin-225 and then sprayed using the same procedure as for surface no. 1. Surface no. 2 is cured at 50° C. for 60 minutes. Surface no. 3 is fabricated from a blend of the fluorinated polyurethane from surface no. 1 and fluoro-functionalized silica particles (irregular aggregates approximately 50-100 nm in average diameter), the synthesis of which is reported in Campos, R., et al. "Fluoroalkyl-Functionalized Silica Particles: Synthesis, Characterization, and Wetting Characteristics," Langmuir 27, 10206-10215 (2011). The two components are dispersed in VERTREL XF™ and then sprayed following the same procedures as surfaces nos. 1 and 2. This surface is cured at 80° C. for 72 hours. Surface no. 4 is comprised of 6061 aluminum (Al) metal that is etched, boiled, and subsequently functionalized with a fluoro-silane, following modified procedures from previously reported techniques in Yang, J. et al., "Superoleophobic Textured Aluminum Surfaces," New Journal of Chemistry, 35, 2422 (2011).

These four SHSs are mechanically durable as shown in FIGS. 6A-6B, easy to fabricate, and are applied over areas of 1.20 m×0.10 m, an order of magnitude larger than most other SHSs previously tested in fully-developed turbulent flows (FIGS. 5D-5E). For each surface, $\theta^*$ is also measured using small droplets with volumes as low as 250 nL, for which $P_L$ approximately 370 Pa. In stark contrast to the conventional, statistically equivalent, low-pressure contact angles, the higher-pressure static contact angles on the four SHSs spanned a range of 20° as shown in FIG. 5B. A decrease in $\theta^*$ necessarily indicates an increase in $r_\phi\phi_s$, and equivalently, an increase in the number and size of texture elements protruding into the flow. In short, a surface that exhibits a large decrease in $\theta^*$ with increasing pressure will exhibit an increase in form drag, as there are more texture elements protruding further into the flow.

Skin-friction of the four SHSs is evaluated in a fully-developed turbulent channel flow in FIG. 5E at various flow speeds using pressure drop measurements and Particle Image Velocimetry (PIV). Two noteworthy characteristics of channel flow prove efficacious when compared to zero-pressure gradient flows for the fundamental evaluation of skin-friction in turbulent flow, and particularly, for the development and characterization of SHSs for drag reduction. First, channel flows are internal and have a confined outer length scale (channel height H or boundary layer thickness δ=H/2), which is fixed by the opposing walls. In zero-pressure gradient flows the outer length scale (δ) is unrestricted and grows as a function of distance along the surface. A fixed outer length scale eliminates the dependence of the spatial location on scaling, and results in the scaling being primarily dependent on the bulk-flow variables. Second, channel flow facilities simplify the determination of frictional drag by measurement of the pressure drop for a fully-developed turbulent flow. Pressure drop analysis offers the simplest, and perhaps, the most widely utilized method of measuring skin-friction for internal flows. Schultz et al., "The Rough-Wall Turbulent Boundary Layer From The Hydraulically Smooth To The Fully Rough Regime," Journal of Fluid Mechanics, 580, pp. 381-405 (2007), provide a thorough discussion of Reynolds-number scaling for turbulent channel flow and ultimately conclude that channel flow results show Reynolds-number scaling trends that are consistent with recent experimental results from pipe and boundary layer flows. The channel's height-based Reynolds number ($Re_H$) here ranges from 10,000 to 30,000, and is calculated using (equation 9).

$$Re_H = \frac{U_m H}{\nu}. \tag{9}$$

Here ν is the kinematic viscosity of water and U, is the streamwise mean flow speed, determined from the volumetric flow rate, and verified with PIV of the entire flow field. PIV is conducted in the x-y mid-plane of the channel, 95H downstream of the channel inlet. As many as 1,200 image pairs are captured, analyzed, and averaged with commercial processing software.

For the system here, drag reduction is defined as $$DR(\%) = 2 \times 100 \left[ \frac{(C_f)_{baseline} - (C_f)_{SHS}}{(C_f)_{baseline}} \right] \tag{10}$$

where $C_f$ is the skin-friction coefficient. The skin-friction is inferred from the streamwise pressure gradient (dP/dx) along one SHS and one baseline hydraulically-smooth (k⁺<<1) surface in a fully-developed turbulent flow channel measuring 1.2 m (L)×0.1 m (W)×0.0073 m (H). The height of the channel is nominally 0.0073 m. However, the presence of the SHS, in addition to systematic error associated with reassembling the test section for each surface evaluated, causes the height to vary by as much as 0.1 mm. As such, the height of the channel is carefully measured at no less than five locations along the length of the test section using a set of precision gage blocks. The resulting heights for each test are recorded, averaged, and used to analyze the performance of the SHS. Any anomalies are noted and corrected prior to testing. The error in the height measurement is estimated to be ±0.05 mm. The pressure drop is measured over a 0.5 m span (70H), starting approximately 50H from the channel inlet, and is used to determine the average local wall-shear stress ($\tau_w$) and wall-shear velocity ($u_\tau$) as:

$$\tau_w = -\frac{H}{2}\frac{dP}{dx} \tag{11}$$

$$u_\tau = \sqrt{\frac{\tau_w}{\rho}} \tag{12}$$

The skin-friction coefficient is then given by:

$$C_f = \frac{\tau_w}{2\rho U_m^2} \tag{13}$$

The factor of two in equation 10 arises as only one of the two channel walls is a SHS. This is equivalently the local skin-friction drag reduction on the SHS, whereas dP/dx is the average pressure drop along the channel with one SHS surface and one hydraulically-smooth surface. A similar scaling is observed by Daniello et al., "Drag Reduction In Turbulent Flows Over Superhydrophobic Surfaces," Physics of Fluids 21, 085103 (2009), using micro-fabricated parallel ridges. They observed an approximate 25% drag reduction in their channel using one SHS and one smooth plate, and an approximate 50% drag reduction in their channel using two SHSs. However, the wall shear stresses measured here, for which drag reduction is still observed, are an order of magnitude greater than that of Daniello et al. as shown in FIG. 7A. The friction on the two sidewalls is neglected due to their small areas and negligible influence on the mean flow properties at the center of the channel. Moreover, local wall shear stress along the top wall of the channel is derived from a simple control volume, constructed along the fully-developed, two-dimensional flow region in the center of the channel. A conservation of momentum analysis of this control volume indicates that shear on the side-walls is negligible. Lastly, although including the side-wall shear provides a better idea of the overall frictional loss through the duct, this differs from the local shear along the SHS and would not be pertinent for turbulence scaling arguments.

None of the SHSs prepared in accordance with certain aspects of the present disclosure are wetted following the high-$Re_H$ flow testing, i.e. there is no loss of entrapped air. However, surfaces nos. 1 and 2 increase the overall measured drag coefficient, $C_T$, the sum of the skin-friction drag and form drag components (FIGS. 8A-8B). Thus, although the entrapped air pockets of surfaces nos. 1 and 2 provide a shear-free interface, the overall wall shear is increased as shown in FIG. 7A. On the other hand, surfaces nos. 3 and 4 show significant drag reduction, as high as 34% at a Reynolds number of 19,000 as indicated in FIGS. 8C-8D. For surfaces nos. 3 and 4, the wall shear is significantly lower than that experienced by a hydraulically smooth baseplate. Using form drag calculations, the drag reduction is both sustainable over hours of continuous high-speed flow ($Re_H$~30,000), and repeatable even after months separating successive runs of the same SHS. To date, scalable SHSs able to reduce drag in fully-developed turbulence, e.g., where the necessary fluid-flow development length (>50H) requires the fabrication of large surfaces, are not believed to have been reported.

To demonstrate the effect of roughness-induced friction, the fabrication methodology of surface no. 2 is slightly modified to either increase or decrease the expected form drag. To increase asperity roughness, a total volume of sprayed solution is doubled. This surface is denoted surface no. 2 (rougher). To decrease asperity roughness, the spray gun is replaced with an airbrush with a much finer nozzle, resulting in smaller texture elements, and is denoted surface no. 2 (less rough). SEMs of the altered surface features are shown in FIGS. 9A-9C. All three variants of surface no. 2 display θ*=165±3° and AO<2°, at ambient pressure. The resultant surfaces, with identical surface chemistry, but slightly different texture, are expected to produce drastically different form drag. When exposed to flow, the rougher variant of surface no. 2 increases the wall shear and form drag significantly FIGS. 7A, 10A. Conversely, the less rough variant of surface no. 2 produces large amounts of drag reduction. The drag savings measured in the channel are in excess of 60% at lower Reynolds number, and span 26% to 90% for the investigated Reynolds numbers ranging from 9,500 to 18,000 (decreased savings with increased speeds). Note that, in the tested channel flow, for $U_\tau=1$ m/s, the mean pressure $P_m \approx 600$ Pa. For $U_m=5$ m/s, $P_m \approx 9400$ Pa, highlighting how increasing Re can drastically alter the pressure exerted on the SHS. Regardless, it is clear that even before the surface is exposed to flow, the method described above can be used to predict the drag-reducing efficacy of a SHS a priori.

The calculated $C_T$ values are the summation of the expected drag on a smooth plate, plus any additional form drag caused by the wetted roughness elements of the SHS. In contrast, the measured drag coefficients are the summation of any form drag due to surface roughness, plus the frictional drag on the mixed slip/no-slip boundary condition SHS. For SHSs, the latter term could be significantly less than the frictional drag experienced on a smooth, no-slip surface. In this case, calculated drag coefficients (open symbols in FIGS. 8A-8D) would be much higher than the measured drag coefficients, as is observed for surface no. 1 (FIG. 8D) and the rougher variant of surface no. 2 (FIG. 10A). Thus, deviation between measured and calculated drag increase most likely indicates surface slip (which decreases drag) that is mitigated by surface roughness (which increases drag). In fact, form drag due to large, sparse ($\phi_s \leq 0.2$) features has been shown to be the major component of total friction for certain texture geometries. When the form drag did not wash out the decrease in frictional drag due to slip, drag reduction is observed as shown in FIGS. 8C-8D.

The effect of the roughness is further examined through the results of the mean velocity profile in the fully-developed channel flow shown in FIG. 7B. The PIV analysis of the hydraulically-smooth, baseline channel is shown to be in good agreement with the mean velocity profiles from the direct numerical simulations (DNS) of Kim et al. However, significant deviation is observed when reviewing the results from the variations of surface no. 2. Specifically, the maximum flow speed, which is typically located along the centerline of a symmetric, fully-developed channel, shifted towards the hydraulically-smooth baseline surface (y=0) as the roughness of the SHS increases. From the streamwise conservation of mass and momentum, this necessarily dictates that the fluid speed decreased near the "rough" wall, and consequently, the interaction with the roughness elements is increased. Ideally, if the roughness elements are small compared to the purely viscous sublayer, which is typically defined as five times the viscous length scale $\delta_v \equiv \nu/u_\tau$, no drag increase is expected. This is observed with the less rough variant of surface no. 2. However, if the roughness elements are large enough to extend beyond the viscous sublayer, roughness effects will become significant, as seen with surface no. 2 and its rougher variant.

Several conventional systems have attempted to limit the allowable root-mean-squared roughness, k, of SHSs that are capable of producing turbulent drag reduction. By non-dimensionalizing k with the viscous length scale, $\delta_v$, a dimensionless roughness value $k^+$ is provided where $k^+=k/\delta_v$. $k^+$ values of 0.1, 0.5 and 1 have been proposed as limits for providing drag reduction. However, samples prepared herein have surfaces with observed drag reduction as high as 8% when $k^+=0.95$, and a drag increase of 19% even when $k^+$ is as low as 0.11 as shown in FIG. 10B. A surface's contact angle hysteresis, measured at higher pressures ($\Delta\theta^{HP}$), explains this unexpected observation as shown in FIGS. 11A-11D. By higher pressures, it is meant that the pressure is greater than or equal to about 150 Pa and in certain aspects, greater than or equal to about 200 Pa. Whereas the conventional measurement of $\Delta\theta$ always results in $\Delta\theta \leq 3°$ for all the surfaces prepared in accordance with the present disclosure (open symbols, FIGS. 11A-11D), the higher pressure measurement varies drastically between surfaces that increase or decrease drag (closed symbols, FIGS. 11A-11D). The product of $k^+$ and $\Delta\theta^{HP}$ collapses drag measurements onto a single curve in FIG. 10C. A similar collapse of the data is observed with the product of $k^+$ and the wetted solid surface area, $r_\phi\phi_s$ in FIG. 10D.

The measured drag reduction using SHSs appears to be dependent on both wettability and flow characteristics. $\Delta\theta^{HP}$ gives some indication of the stability of the entrapped air pockets, but says nothing about how the flow will interact with these air pockets or the texture elements entrapping them. Conversely, $k^+$ designates if the roughness features will interact with the viscous sublayer, but gives no indication as to how much of the roughness the flow will see (i.e., where the meniscus will lie). For example, consider the nanograss evaluated in turbulent flow by Henoch et al., in 3rd AIAA Flow Control Conference Fluid Dynamics and Co-located Conferences (American Institute of Aeronautics and Astronautics, 2006), which consisted of nano-posts with diameters of 400 nm and heights of 7 μm. If the height of such posts is arbitrarily increased, $k^+$ would become extremely large. However, the flat meniscus pinned on the top of these posts ensures that the flow would be oblivious to this additional roughness. Moreover, in laminar flow, in which roughness effects are often negligible, minimizing $\Delta\theta$ has been shown previously to maximize drag reduction. This finding is extended to turbulent flow, with two additional factors: the pressure and the surface roughness must also be considered. Thus, to maximize friction drag reduction in turbulent flow, SHSs are designed in accordance with the present disclosure such that both $k^+$ and $\Delta\theta^{HP}$ are minimized. As discussed herein, in certain aspects, a reduction in friction is only observed when a product of dimensionless roughness ($k^+$) and contact angle hysteresis at high pressure ($\Delta\theta^{HP}$) is less than or equal to about 5.5±0.3. Thus, in accordance with certain aspects of the present disclosure, the superhydrophobic surfaces that exhibit drag reduction in turbulent flow conditions have a product of $k^{+*}\Delta\theta^{HP}$ of less than or equal to about 5.8.

It is noted that drag increase caused by SHSs with large $k^+$ is somewhat unexpected. A surface is considered hydrodynamically smooth when $k^+ \leq 5.0$. Only when $k^+ \geq 60$ is the surface considered fully rough. A fully rough surface will exhibit a drag coefficient independent of Reynolds number. Quite remarkably, such a trend for surfaces nos. 1 and 2 and the rougher variant of surface no. 2 are observed, although for all Reynolds numbers tested, k+<4.5. Some explanation can be found in the computational work of Jelly et al., "Turbulence And Skin Friction Modification In Channel Flow With Streamwise-Aligned Superhydrophobic Surface Texture," Physics of Fluids 26, 095102, (2014), which found that over 70% of the friction on the regions of no-slip (wetted solid surfaces, $r_\phi\phi_s$) is a direct result of the presence of the slip regions (air pockets, $1-\phi_s$). Thus, the deleterious roughness effects of SHSs with $k^+>1.0$ may be amplified by the entrapped air pockets. Moreover, as Min, T. et al., "Effects Of Hydrophobic Surface On Skin-Friction Drag,"

Physics of Fluids, 16, L55-L58, (2004) have computed, and Woolford et al. experimentally confirmed in Woolford, et al., "Particle image velocimetry characterization of turbulent channel flow with rib patterned superhydrophobic walls," Physics of Fluids, 21, 085106 (2009), entrapped air pockets that produce spanwise slip unambiguously increase drag.

Thus, in certain variations, the present disclosure provides scalable, mechanically robust superhydrophobic surfaces that significantly reduce skin-friction, by more than 50%, in high-speed turbulent flows such as those relevant to many naval applications. In certain aspects, SHSs are fabricated that minimize the product of the non-dimensional roughness $k^+$ and the contact angle hysteresis measured at higher pressures.

The present disclosure provides in certain variations, a component comprising a surface that is superhydrophobic and reduces drag in turbulent flow conditions. The surface may have an apparent advancing dynamic contact angle of greater than or equal to about 150° for water and a roll-off angle of less than or equal to about 15° for water and a product of dimensionless root-mean-squared roughness ($k^+$) and a contact angle hysteresis at high pressure ($\Delta\theta^{HP}$) of less than or equal to about 5.8. In certain aspects, the product of dimensionless root-mean-squared roughness ($k^+$) and a contact angle hysteresis at high pressure ($\Delta\theta^{HP}$) is minimized to be as close to 0 as possible, but may be greater than 0 to less than or equal to about 5.8. In various aspects, a superhydrophobic drag-reducing surface has a contact angle hysteresis of less than or equal to about 15° or any of the values discussed previously above in the context of the superhydrophobic surfaces. The superhydrophobic coated surface of a component desirably exhibits drag reduction in both laminar and turbulent flow conditions. Superhydrophobic drag-reducing materials that desirably exhibit such properties include the following example embodiments.

In certain aspects, the surface comprises a superhydrophobic material comprising a low surface energy material and a polymeric material like those described above that have a product of dimensionless roughness ($k^+$) and a higher-pressure contact angle hysteresis ($\Delta\theta^{HP}$) is less than or equal to about 5.8. As shown in the examples detailed herein, surface nos. 2, 3, and 4 showed drag-reducing in turbulent conditions tested. However, it should be noted that because $k^+$ depends on the flow conditions ($k^+$ is the root-mean-squared roughness divided by the viscous length scale of the flow, which can vary greatly), a surface may or may not reduce drag, depending on the flow conditions. For example, surface no. 1 in these conditions appears to increase drag; however, it has also been observed to decrease drag under other experimental conditions where a viscous length scale is 2-3 times larger than in the present experiments. Thus, a $k^+$ value and higher-pressure contact angle hysteresis value indicate drag reduction ability, but the actual specific performance can vary based on actual flow conditions.

In certain other variations, the superhydrophobic drag-reducing material comprises a polymeric material, such as a fluorinated polymer like fluorinated polyurethane, and a plurality of low surface energy particles, such as fluoro-functionalized silica particles.

However, any of the previous materials described above may be appropriate for selection in the superhydrophobic drag-reducing materials. The polymeric material may thus be selected from the group consisting of: polydimethylsiloxane (PDMS), polyurethane (PU), fluorinated polyurethane (FPU), perfluoropolyether (PFPE), cyanoacrylate, ethyl-cyanoacrylate, chlorinated rubber, natural rubber, epoxy, polystyrene, polyvinyl chloride, polyethylene, polypropylene, polyisobutylene, polyisoprene, polymethyl methacrylate, polyvinylidine fluoride, polyethylene terephthalate, polyvinyl ether, polyvinyl acetate, cellulose acetate, ethyl cellulose, and combinations thereof. In certain variations, the polymeric material may be a fluorinated polymer selected from the group consisting of: fluorinated polyurethane (FPU), perfluoropolyether (PFPE), and combinations thereof.

Thus, the low surface energy material may be selected from the group consisting of: octakis(1H,1H,2H,2H-heptadecafluorodecyl) polyhedral oligomeric silsesquioxane (F-POSS), octakis(1H,1H,2H,2H-tridecafluorooctyl) polyhedral oligomeric silsesquioxane, octaisobutyl polyhedral oligomeric silsesquioxane (OibPOSS), octakis(1H,1H,2H,2H-nonafluorohexyl) polyhedral oligomeric silsesquioxane, alkanes having 18 or more carbon atoms, fluoro-functionalized silica particles, alkyl-functionalized silica particles, polydimethylsiloxane-functionalized silica particles, polytetrafluoroethylene (PTFE) particles, perfluoropolyether (PFPE) particles, polydimethylsiloxanes (PDMS) particles, polystyrene particles, polyethylene particles, and combinations thereof.

Such a material may comprise greater than or equal to about 45% by mass to less than or equal to about 75% by mass of the polymeric material and greater than or equal to about 25% by mass to less than or equal to about 55% by mass of the low surface energy particles. In certain variations, the material may comprise about 65% by mass of the fluorinated polymeric material and about 35% of the low surface energy particles.

In other variations, the superhydrophobic drag-reducing material comprises a polymeric material, like an ethyl-cyanoacrylate (superglue) polymeric binder, and a low surface energy material, like F-POSS. Such a superhydrophobic drag-reducing material may comprise greater than or equal to about 40% by mass to less than or equal to about 60% by mass of the polymeric material and greater than or equal to about 40% by mass to less than or equal to about 60% by mass of the low surface energy material. In certain variations, the material may comprise about 50% by mass of the polymeric material, like cyanoacrylate, and about 50% of the low surface energy material, like F-POSS. An average surface roughness (RMS) of this superhydrophobic drag-reducing material is desirably less than or equal to about 50 μm, with a more preferred roughness of less than or equal to 3 μm. The optimal average surface roughness may vary, depending on the flow conditions. A higher-pressure contact angle hysteresis ($\Delta\theta^{HP}$) is less than or equal to about 20°, preferably less than or equal to about 10°.

In yet other embodiments, the superhydrophobic drag-reducing material comprises a fluoropolymer. The fluoropolymer may be a coating formed from a fluorosilane. The fluorosilane may be reacted with and coated onto a metal surface, such as aluminum or steel. Suitable fluorosilanes include heptadecafluoro-1,1,2,2-tetrahydrodecyl triethoxysilane (1H, 1H,2H,2H-Heptadecafluorodecyl triethoxysilane), (tridecafluoro-1,1,2,2-tetrahydrooctyl)trichlorosilane, (3,3,3-trifluoropropyl)trichlorosilane, (tridecafluoro-1,1,2,2-tetrahydrooctyl)triethoxysilane, chlorodimethylsilane trichloromethylsilane, chlorodimethylsilane, dimethyldimethoxysilane, ethyldimethylchlorosilane, heptadecafluoro tetrahydrodecyl dimethyl monochlorosilane, heptadecafluoro tetrahydrodecyl tricholorsilane, n-butyldimethylchlorosilane,n-decyldimethylchlorosilane, n-octadecyldimethylchlorosilane,n-octadecyltrichlorosilane, n-octyldimethylchlorosilane, n-propyldimethylchlorosilane, nonafluorohexyl trichlorosilane, nonafluoro hexyl triethoxysilane, and combinations thereof. In other aspects, the superhydrophobic drag-reducing material is formed from other silanes reacted with the metal surface, such as chlorodimethylsilane trichloromethylsilane, chlorodimethylsilane, dimethyldimethoxysilane, ethyldimethylchlorosilane, n-butyldimethylchlorosilane, n-decyldimethylchlorosilane, n-octadecyldimethylchlorosilane, n-octadecyltrichlorosilane, n-octyldimethylchlorosilane, n-propyldimethylchlorosilane, polydimethyl siloxane-based silanes, and combinations thereof.

It is believed that a fluorosilanized (or other silanized) coating only reduces drag on roughened metal, where the P* of the metal is <1.0. Here, the metal is roughened with acid etching and subsequent boiling. Other roughening techniques are also contemplated.

In various aspects, a superhydrophobic drag-reducing surface is highly durable and exhibits the desired a product of dimensionless roughness ($k^+$) and a higher-pressure contact angle hysteresis ($\Delta\theta^{HP}$) of less than or equal to about 5.8 and/or a contact angle hysteresis of less than or equal to about 15° for water or any of the contact angle hysteresis values described previously after multiple abrasion cycles.

In certain variations, such properties remain after greater than or equal to about 100 abrasion cycles, optionally after greater than or equal to about 150 abrasion cycles, optionally after greater than or equal to about 200 abrasion cycles, optionally after greater than or equal to about 300 abrasion cycles, optionally after greater than or equal to about 400 abrasion cycles, optionally after greater than or equal to about 500 abrasion cycles, optionally after greater than or equal to about 600 abrasion cycles, optionally after greater than or equal to about 700 abrasion cycles, optionally after greater than or equal to about 800 abrasion cycles, optionally after greater than or equal to about 900 abrasion cycles, optionally after greater than or equal to about 1,000 abrasion cycles, optionally after greater than or equal to about 2,000 abrasion cycles, optionally after greater than or equal to about 3,000 abrasion cycles, optionally after greater than or equal to about 4,000 abrasion cycles, and in certain aspects, optionally after greater than or equal to about 5,000 abrasion cycles. Any of the properties described above in the context of the superhydrophobic surfaces are also applicable to the embodiments of the superhydrophobic drag-reducing surfaces discussed just above.

Thus, in designing superhydrophobic drag-reducing surfaces, considering both the both wettability and the flow-dependent characteristics of a SHS helps to achieve turbulent drag reduction. The conventional characterization techniques for SHSs are lacking and could not predict if and when a surface can produce turbulent drag reduction. However, the drag reducing superhydrophobic surfaces of certain variations of the present disclosure provide significant potential energy and fuel savings for marine vessels, vehicles, industrial equipment, and various other applications.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A durable superhydrophobic component comprising a surface having a superhydrophobic material disposed thereon that exhibits an apparent advancing dynamic contact angle for liquid water of greater than or equal to about 150° and a roll-off angle for liquid water of less than or equal to about 15° after at least 100 abrasion cycles conducted in accordance with ASTM standard D4060, wherein the superhydrophobic material comprises a low surface energy material at greater than or equal to about 10% to less than or equal to about 55% by mass of the superhydrophobic material and a polymeric material at greater than or equal to about 45% to less than or equal to about 90% by mass of the superhydrophobic material, the low surface energy material is selected from the group consisting of: octakis(1H,1H,2H,2H-heptadecafluorodecyl) polyhedral oligomeric silsesquioxane (F-POSS), octakis(1H,1H,2H,2H-tridecafluorooctyl) polyhedral oligomeric silsesquioxane, octaisobutyl polyhedral oligomeric silsesquioxane (OibPOSS), octakis(1H,1H,2H,2H-nonafluorohexyl) polyhedral oligomeric silsesquioxane, alkanes having 18 or more carbon atoms, fluoro-functionalized silica particles, alkyl-functionalized silica particles, polydimethylsiloxane-functionalized silica particles, polytetrafluoroethylene (PTFE) particles, perfluoropolyether (PFPE) particles, polydimethylsiloxanes (PDMS) particles, polystyrene particles, polyethylene particles, and combinations thereof and the polymeric material is selected from the group consisting of: polydimethylsiloxane (PDMS), polyurethane (PU), fluorinated polyurethane (FPU), perfluoropolyether (PFPE), cyanoacrylate, ethyl-cyanoacrylate, chlorinated rubber, natural rubber, epoxy, polystyrene, polyvinyl chloride, polyethylene, polypropylene, polyisobutylene, polyisoprene, polymethyl methacrylate, polyvinylidine fluoride, polyethylene terephthalate, polyvinyl ether, polyvinyl acetate, cellulose acetate, ethyl cellulose, and combinations thereof.

2. The durable superhydrophobic component of claim 1, wherein the surface of the component in the absence of the superhydrophobic material has a superhydrophobic potential (P*) less than or equal to about 1.

3. The durable superhydrophobic component of claim 1, wherein a miscibility parameter (S*) for the low surface energy material and the polymeric material is less than about 1.

4. The durable superhydrophobic component of claim 3, wherein the low surface energy material comprises octakis (1H,1H,2H,2H-heptadecafluorodecyl) polyhedral oligomeric silsesquioxane (F-POSS) and the polymeric material comprises fluorinated polyurethane (FPU).

5. The durable superhydrophobic component of claim 4, wherein the superhydrophobic material has greater than or equal to about 10% to less than or equal to about 25% by mass of the low surface energy material and greater than or equal to about 75% to less than or equal to about 90% by mass of the polymeric material.

6. The durable superhydrophobic component of claim 3, wherein the miscibility parameter (S*) for the low surface energy material and the polymeric material is greater than or equal to about 0.4 and less than or equal to about 0.9.

7. The durable superhydrophobic component of claim 1, wherein the apparent advancing dynamic contact angle for liquid water of the superhydrophobic material is greater than or equal to about 150° and the roll-off angle for liquid water is less than or equal to about 15° after at least 400 abrasion cycles conducted in accordance with ASTM standard D4060.

8. The durable superhydrophobic component of claim 1, wherein the apparent advancing dynamic contact angle for liquid water of the superhydrophobic material is greater than or equal to about 150° and the roll-off angle for liquid water is less than or equal to about 15° after at least 1,000 abrasion cycles conducted in accordance with ASTM standard D4060.

9. The durable superhydrophobic component of claim 1, wherein the superhydrophobic material has a contact angle hysteresis of less than or equal to about 15° for liquid water after at least 200 abrasion cycles conducted in accordance with ASTM standard D4060.

10. A durable superhydrophobic component comprising a surface having a superhydrophobic material disposed thereon that exhibits an apparent advancing dynamic contact angle for liquid water of greater than or equal to about 150° and a roll-off angle for liquid water of less than or equal to about 15° after at least 100 abrasion cycles conducted in accordance with ASTM standard D4060, wherein the superhydrophobic material comprises octakis(1H,1H,2H,2H-heptadecafluorodecyl) polyhedral oligomeric silsesquioxane (F-POSS) and a polymeric material comprising fluorinated polyurethane (FPU).

11. The durable superhydrophobic component of claim 10, wherein the superhydrophobic material comprises F-POSS at greater than or equal to about 10% to less than or equal to about 55% by mass of the superhydrophobic material and the polymeric material at greater than or equal to about 45% to less than or equal to about 90% by mass of the superhydrophobic material.

12. The durable superhydrophobic component of claim 10, wherein the apparent advancing dynamic contact angle for liquid water of the superhydrophobic material is greater than or equal to about 150° and the roll-off angle for liquid water is less than or equal to about 15° after at least 400 abrasion cycles conducted in accordance with ASTM standard D4060.

13. The durable superhydrophobic component of claim 10, wherein the apparent advancing dynamic for liquid water contact angle for liquid water of the superhydrophobic material is greater than or equal to about 150° and the roll-off angle for liquid water is less than or equal to about 15° after at least 1,000 abrasion cycles conducted in accordance with ASTM standard D4060.

14. The durable superhydrophobic component of claim 10, wherein the superhydrophobic material has a contact angle hysteresis of less than or equal to about 15° for liquid water after at least 200 abrasion cycles conducted in accordance with ASTM standard D4060.

15. A method of making a durable superhydrophobic component comprising:
spraying a substrate with a blend of a low surface energy material and a polymeric material precursor to form a superhydrophobic layer, wherein a miscibility parameter (S*) for the low surface energy material and the polymeric material is less than or equal to about 1, wherein the superhydrophobic layer on the substrate has an apparent advancing dynamic contact angle for liquid water of greater than or equal to about 150° and a roll-off angle for liquid water of less than or equal to about 15° after at least 100 abrasion cycles conducted in accordance with ASTM standard D4060, wherein the superhydrophobic material comprises the low surface energy material at greater than or equal to about 10% to less than or equal to about 55% by mass of the superhydrophobic material and the polymeric material at greater than or equal to about 45% to less than or equal to about 90% by mass of the superhydrophobic material, the low surface energy material is selected from the group consisting of: octakis(1H,1H,2H,2H-heptadecafluorodecyl) polyhedral oligomeric silsesquioxane (F-POSS), octakis(1H,1H,2H,2H-tridecafluorooctyl) polyhedral oligomeric silsesquioxane, octaisobutyl polyhedral oligomeric silsesquioxane (OibPOSS), octakis(1H,1H,2H,2H-nonafluorohexyl) polyhedral oligomeric silsesquioxane, alkanes having 18 or more carbon atoms, fluoro-functionalized silica particles, alkyl-functionalized silica particles, polydimethylsiloxane-functionalized silica particles, polytetrafluoroethylene (PTFE) particles, perfluoropolyether (PFPE) particles, polydimethylsiloxanes (PDMS) particles, polystyrene particles, polyethylene particles, and combinations thereof and the polymeric material is selected from the group consisting of: polydimethylsiloxane (PDMS), polyurethane (PU), fluorinated polyurethane (FPU), perfluoropolyether (PFPE), cyanoacrylate, ethyl-cyanoacrylate, chlorinated rubber, natural rubber, epoxy, polystyrene, polyvinyl chloride, polyethylene, polypropylene, polyisobutylene, polyisoprene, polymethyl methacrylate, polyvinylidine fluoride, polyethylene terephthalate, polyvinyl ether, polyvinyl acetate, cellulose acetate, ethyl cellulose, and combinations thereof.

16. The method of claim 15, wherein the low surface energy material is selected from the group consisting of: octakis(1H,1H,2H,2H-heptadecafluorodecyl) polyhedral oligomeric silsesquioxane (F-POSS), octakis(1H,1H,2H,2H-tridecafluorooctyl) polyhedral oligomeric silsesquioxane, octaisobutyl polyhedral oligomeric silsesquioxane (OibPOSS), octakis(1H,1H,2H,2H-nonafluorohexyl) polyhedral oligomeric silsesquioxane, alkanes having 18 or more carbon atoms, and combinations thereof.

17. The method of claim 15, wherein the low surface energy material is selected from the group consisting of: fluoro-functionalized silica particles, alkyl-functionalized silica particles, polydimethylsiloxane-functionalized silica particles, polytetrafluoroethylene (PTFE) particles, perfluoropolyether (PFPE) particles, polydimethylsiloxanes (PDMS) particles, polystyrene particles, polyethylene particles, and combinations thereof.

18. The method of claim 15, wherein the polymeric material is selected from the group consisting of: polydimethylsiloxane (PDMS), polyurethane (PU), fluorinated polyurethane (FPU), and combinations thereof.

19. The method of claim 15, wherein the low surface energy material comprises octakis(1H,1H,2H,2H-heptadecafluorodecyl) polyhedral oligomeric silsesquioxane (F-POSS) and the polymeric material comprises fluorinated polyurethane (FPU).

20. The method of claim 15, wherein the superhydrophobic materials has greater than or equal to about 10% to less than or equal to about 40% by mass of the low surface energy material and greater than or equal to about 60% to less than or equal to about 90% by mass of the polymeric material.

21. The method of claim 15, wherein the miscibility parameter (S*) for the low surface energy material and the polymeric material is greater than or equal to about 0.4 and less than or equal to about 0.9.

* * * * *

UNITED STATES PATENT AND TRADEMARK OFFICE
CERTIFICATE OF CORRECTION

PATENT NO. : 11,203,695 B2
APPLICATION NO. : 16/330987
DATED : December 21, 2021
INVENTOR(S) : Tuteja et al.

Page 1 of 1

It is certified that error appears in the above-identified patent and that said Letters Patent is hereby corrected as shown below:

In the Claims

At Column 37, Claim number 13, Lines 39-40, after "dynamic", delete "for liquid water".

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*